(12) United States Patent
Brown et al.

(10) Patent No.: US 7,657,636 B2
(45) Date of Patent: Feb. 2, 2010

(54) WORKFLOW DECISION MANAGEMENT WITH INTERMEDIATE MESSAGE VALIDATION

(75) Inventors: William A. Brown, Raleigh, NC (US); Richard W. Muirhead, Tyler, TX (US); Francis X. Reddington, Richmond, VA (US)

(73) Assignee: International Business Machines Corporation, Armonk, NY (US)

( * ) Notice: Subject to any disclaimer, the term of this patent is extended or adjusted under 35 U.S.C. 154(b) by 705 days.

(21) Appl. No.: 11/264,806

(22) Filed: Nov. 1, 2005

(65) Prior Publication Data

US 2007/0101007 A1    May 3, 2007

(51) Int. Cl.
G06F 15/16 (2006.01)
(52) U.S. Cl. .................. 709/228; 709/223; 709/224
(58) Field of Classification Search .................. 709/223, 709/228
See application file for complete search history.

(56) References Cited

U.S. PATENT DOCUMENTS

| | | | |
|---|---|---|---|
| 5,546,463 A | | 8/1996 | Caputo et al. |
| 5,572,438 A | | 11/1996 | Ehlers et al. |
| 5,745,864 A | | 4/1998 | Hosoe et al. |
| 5,768,284 A | | 6/1998 | Cox |
| 5,825,857 A | | 10/1998 | Reto et al. |
| 5,978,371 A | * | 11/1999 | Mason et al. ............... 370/389 |
| 6,100,817 A | * | 8/2000 | Mason et al. .......... 340/870.02 |
| 6,108,775 A | | 8/2000 | Shiell et al. |
| 6,170,002 B1 | | 1/2001 | Ouchi |
| 6,192,282 B1 | | 2/2001 | Smith et al. |
| 6,453,687 B2 | | 9/2002 | Sharood et al. |
| 6,768,809 B2 | * | 7/2004 | Rhoads et al. ............... 382/100 |
| 6,865,427 B2 | | 3/2005 | Brown et al. |
| 6,865,428 B2 | | 3/2005 | Gonzales et al. |
| 6,912,429 B1 | | 6/2005 | Bilger |
| 6,934,684 B2 | | 8/2005 | Alpdemir et al. |
| 7,016,888 B2 | | 3/2006 | Slemmer et al. |
| 7,103,420 B2 | | 9/2006 | Brown et al. |
| 7,289,966 B2 | | 10/2007 | Ouchi |
| 7,315,542 B2 | * | 1/2008 | Gil et al. ..................... 370/392 |
| 2001/0049761 A1 | * | 12/2001 | Huang ........................ 710/126 |
| 2002/0087534 A1 | | 7/2002 | Blackman et al. |
| 2002/0123928 A1 | | 9/2002 | Eldering et al. |
| 2003/0009507 A1 | | 1/2003 | Shum |
| 2003/0023728 A1 | | 1/2003 | Yaung |

(Continued)

OTHER PUBLICATIONS

Pakkam, Sairaj R., "Performance Evaluation of the Consumer Electronic Bus", Sep. 4, 1990, IEEE, pp. 949-953.*

(Continued)

Primary Examiner—Firmin Backer
Assistant Examiner—Jonathan Bui
(74) Attorney, Agent, or Firm—H. Artoush Ohaninan; William H. Steinberg; Biggers & Ohanian LLP.

(57) ABSTRACT

Methods, systems, and computer program products are provided for workflow decision management. Embodiments include maintaining a device state history; identifying a device usage pattern in dependence upon the device state history; identifying a workflow scenario in dependence upon the device usage pattern; identifying a workflow in dependence upon the workflow scenario; executing the workflow including: sending, to an intermediate message validation service, a message to be forwarded to a device to administer at least one value of an attribute of the device; determining, by the intermediate message validation service, that the message is valid; and forwarding, by the intermediate message validation service, the valid message to the device.

18 Claims, 12 Drawing Sheets

U.S. PATENT DOCUMENTS

| | | | |
|---|---|---|---|
| 2003/0037141 A1* | 2/2003 | Milo et al. | 709/225 |
| 2003/0103232 A1 | 6/2003 | Twede | |
| 2003/0147516 A1 | 8/2003 | Lawyer et al. | |
| 2003/0154123 A1 | 8/2003 | Subbloie et al. | |
| 2003/0233155 A1 | 12/2003 | Slemmer et al. | |
| 2004/0015241 A1 | 1/2004 | Brown et al. | |
| 2004/0015242 A1* | 1/2004 | Brown et al. | 700/12 |
| 2004/0083305 A1* | 4/2004 | Wang et al. | 709/240 |
| 2004/0236819 A1 | 11/2004 | Anati et al. | |
| 2004/0243699 A1 | 12/2004 | Koclanes et al. | |
| 2005/0065753 A1 | 3/2005 | Bilgus | |
| 2005/0212759 A1 | 9/2005 | Marvit et al. | |
| 2006/0059107 A1 | 3/2006 | Elmore et al. | |
| 2006/0248145 A1* | 11/2006 | Karmakar et al. | 709/206 |
| 2007/0005623 A1* | 1/2007 | Self et al. | 707/101 |
| 2007/0060976 A1* | 3/2007 | Denzene et al. | 607/60 |
| 2007/0061322 A1 | 3/2007 | Nemoto | |
| 2007/0098013 A1* | 5/2007 | Brown et al. | 370/466 |
| 2007/0100990 A1* | 5/2007 | Brown et al. | 709/224 |
| 2008/0178193 A1 | 7/2008 | Brown et al. | |

OTHER PUBLICATIONS

Heierman, Edwin O., III and Diane J. Cook, "Improving Home Automation by Discovering Regularly Occurring Device Usage Patterns," Proceedings of the Third IEEE International Conference on Data Mining, Nov. 19-22, 2003, pp. 537-540.
Office Action Dated Dec. 27, 2007 in U.S. Appl. No. 10/844,636.
Office Action Dated Jul. 2, 2007 in U.S. Appl. No. 10/844,636.
Final Office Action Dated Jul. 9, 2008 in U.S. Appl. No. 10/844,636.
Office Action Dated Mar. 23, 2009 in U.S. Appl. No. 10/844,636.
Office Action Dated Mar. 11, 2008 in U.S. Appl. No. 11/032,334.
Final Office Action Dated Sep. 15, 2008 in U.S. Appl. No. 11/032,334.
Office Action Dated Aug. 26, 2008 in U.S. Appl. No. 11/032,336.
Final Office Action Dated Feb. 18, 2009 in U.S. Appl. No. 11/032,336.
Office Action Dated Apr. 27, 2009 in U.S. Appl. No. 11/032,337.
Office Action Dated May 27, 2009 in U.S. Appl. No. 11/032,337.
Office Action Dated Apr. 14, 2008 in U.S. Appl. No. 11/264,714.
Final Office Action Dated Oct. 17, 2008 in U.S. Appl. No. 11/264,714.
Office Action Dated Feb. 27, 2009 in U.S. Appl. No. 11/264,714.
Office Action Dated Dec. 8, 2008 in U.S. Appl. No. 11/264,806.
Office Action Dated Sep. 16, 2008 in U.S. Appl. No. 11/264,736.
Office Action Dated Mar. 3, 2009 in U.S. Appl. No. 11/264,736.
Office Action Dated Mar. 16, 2009 in U.S. Appl. No. 11/264,717.
Office Action Dated Apr. 3, 2009 in U.S. Appl. No. 11/264,716.
Office Action Dated Apr. 1, 2009 in U.S. Appl. No. 12/061,760.

* cited by examiner

Device
150

Device ID ~ 302
Address ~ 304
Attribute ~ 306

Scenario
344

Scenario ID ~ 346
Workflow ID ~ 340
Description ~ 350
Message Pattern ID ~ 462

Device Threshold
308

Device ID ~ 302
Max ~ 310
Min ~ 312

Device State
330

Device ID ~ 302
Device State ID ~ 316
Description ~ 328

Workflow
338

Workflow ID ~ 340
Sequence Number ~ 342

User
374

User ID ~ 376
Role ID ~ 378

Device State History
314

Device ID ~ 302
Device State ID ~ 316
Value ~ 318
Time Stamp ~ 320

Workflow Session
362

Workflow Session ID ~ 364
Workflow ID ~ 340
User Session State ID ~ 366
Message ID ~ 368
User ID ~ 370
Role ID ~ 372

User Session State
382

Session State ID ~ 384
Message ID ~ 386
User ID ~ 376
Role ID ~ 378

Device Usage
328

Usage ID ~ 331
Device ID ~ 302
Device State ID ~ 316
Value ~ 318

Derived Scenario
352

Derived Scenario ID ~ 354
Tolerance ID ~ 356
Workflow ID ~ 340
Description ~ 358

Usage
332

Usage ID ~ 334
Description ~ 336

Tolerance
360

Tolerance Level ID ~ 362

FIG. 3

Role
402
Role ID ~ 378

Role Device Privileges
404
Role Privileges ID ~ 406
Privileges ID ~ 408
Role ID ~ 378

Privileges
402
Privileges ID ~ 408
Description ~ 410
Read Flag ~ 412
Write Flag ~ 414

Message
416
Message ID ~ 386
Message Log ID ~ 722
Origin Address ~ 418
Destination Address ~ 420
Validator ID - 992

Device Privileges
422
Device Privilege ID ~ 424
Device ID ~ 302
Privileges ID ~ 406

Message Bridge
450
Message Bridge ID ~ 452
Msg ID ~ 454
Origin Address ~ 418
Destination ID ~ 420
Internetwork Address ~ 456

Message Log
722
Message Log ID ~ 724
Message ID ~ 725
Message Logged ~ 726
Time ~ 762

Message Pattern
460
Message Pattern ID ~ 462
Message Type ~ 464
Device ID ~ 465
Attributes ~ 463
Message Sequence ID ~ 466
Message Log ID ~ 724

Message Validator
990
Validator ID ~ 992
Dead Message Queue ID - 994
Message Log ID~ 724

Dead Message Queue
996
Dead Message Queue ID ~ 994
Message ID ~ 725
Message Logged ~ 726
Time ~ 762

FIG. 4

WORKFLOW DECISION MANAGEMENT WITH INTERMEDIATE MESSAGE VALIDATION

BACKGROUND OF THE INVENTION

1. Field of the Invention

The field of the invention is data processing, or, more specifically, methods, systems, and products for workflow decision management.

2. Description of Related Art

Conventional networks contain various networked devices. User's often use the various devices, or adjust particular settings of the devices, in accordance with consistent patterns and scenarios of device usage. Despite routinely using devices according to these consistent patterns and scenarios of device usage, conventional networked devices still often require user intervention to change attribute values of a device. It would be advantageous if there were a method of workflow decision management that used workflows to change in values of device attributes in a network in dependence upon identified patterns of usage and identified scenarios that did not require user intervention.

SUMMARY OF THE INVENTION

Methods, systems, and computer program products are provided for workflow decision management. Embodiments include maintaining a device state history; identifying a device usage pattern in dependence upon the device state history; identifying a workflow scenario in dependence upon the device usage pattern; identifying a workflow in dependence upon the workflow scenario; executing the workflow including: sending, to an intermediate message validation service, a message to be forwarded to a device to administer at least one value of an attribute of the device; determining, by the intermediate message validation service, that the message is valid; and forwarding, by the intermediate message validation service, the valid message to the device.

Determining, by the intermediate message validation service, that the message is valid may include determining differences between the structure of a packet of the message and a predefined proper packet structure; and determining that differences between the structure of the packet of the message and the predefined proper packet structure do not exceed a threshold similarity requirement. Determining differences between the structure of a packet of the message and a predefined proper packet structure may include counting the differences between the structure of a packet of the message and a predefined proper packet structure. Determining differences between the structure of a packet of the message and a predefined proper packet structure may include identifying a qualitative difference between the structure of a packet of the message and a predefined proper packet structure.

The predefined proper packet structure may be a predefined proper packets structure for the device. The predefined proper packet structure may be a predefined proper packets structure for a network of the device.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

FIG. 3 sets forth a block diagram illustrating exemplary data structures useful in implementing methods of workflow decision management according to aspects of the present invention.

FIG. 4 sets forth a block diagrams illustrating more exemplary data structures useful in implementing methods of workflow decision management according to aspects of the present invention FIG. 5 sets forth a block diagram illustrating an exemplary relationship among the data structures of FIGS. 3 and 4.

DETAILED DESCRIPTION OF EXEMPLARY EMBODIMENTS

Definitions

Figure 1:
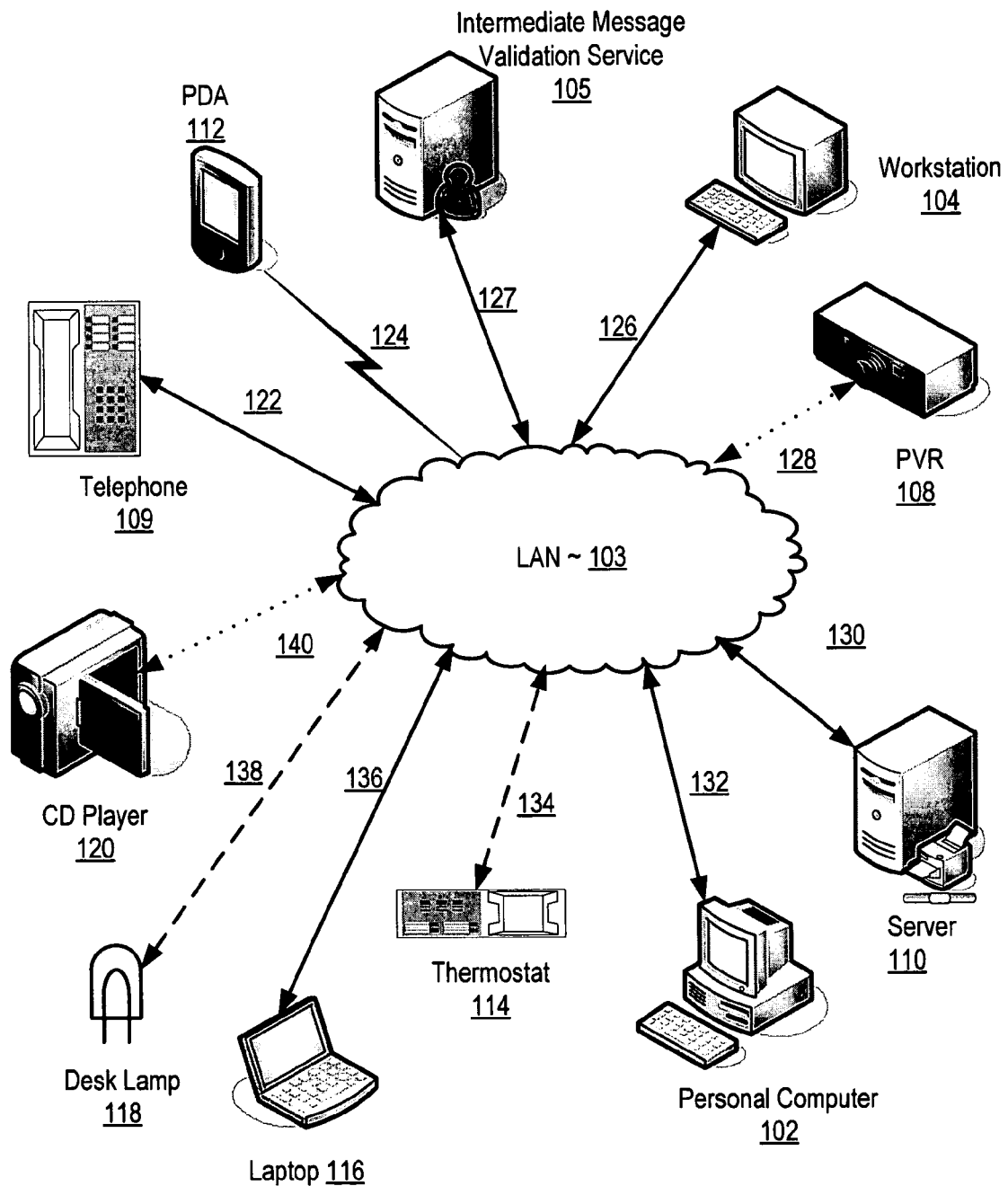
FIG. 1 depicts an exemplary data processing system capable of workflow decision management according to embodiments of the present invention.

"802.11" refers to a family of specifications developed by the IEEE for wireless LAN technology. 802.11 specifies an over-the-air interface between a wireless client and a base station or between two wireless clients.

"API" is an abbreviation for "application programming interface." An API is a set of routines, protocols, and tools for building software applications.

"BLUETOOTH" refers to an industrial specification for a short-range radio technology for RF couplings among client devices and between client devices and resources on a LAN or other network. An administrative body called the BLUETOOTH Special Interest Group tests and qualifies devices as BLUETOOTH compliant. The BLUETOOTH specification consists of a 'Foundation Core,' which provides design specifications, and a 'Foundation Profile,' which provides interoperability guidelines.

"CEBus" is an abbreviation for Consumer Electronics Bus. CEBus is an open international standard for controlling devices over different media such as power line, radio frequency (RF), infrared (IR), coaxial cable, twisted pair, fiber optics and audio/video. The CEBus standard is promulgated by the Consumer Electronic Manufacturers Association (CEMA), a sector of the Electronics Industries Association (EIA) and described in 12 standards: the ANSI/EIA-600 series. The CEBus standard describes a physical design and topology of network media, a protocol for message generation, and a common application language ("CAL").

CEBus provides a Common Application Language (CAL) defined in EIA 600.81 that uses an object-oriented model to provide interoperability between diverse devices in a networked environment. The CAL specification defines a set of classes that provide an interface to the internal operations of these disparate networked devices. If a function or feature cannot be mapped well to one of the classes defined in the CAL specification, the CAL specification has set aside a specific range of class identifiers for defining special classes.

CAL objects have two important attributes Instance Variables and Methods. Instance Variables contain information about a particular CAL object such as Boolean indications, numeric information, character-string information, and other data. Boolean Instance Variables can only be set to TRUE or FALSE. As the name implies, numeric Instance Variables are intended for storage of numbers. The character-string type Instance Variables provide storage of text. And other data-type Instance Variables provide storage of other information as a single-dimensioned array of one or more elements; each element containing the same number of one or more bytes.

Access to the information contained in CAL Instance Variables is accomplished through a set of member methods specific to that object. Examples of common methods include: setOn, setOff, setValue, getValue, setArray and getArray. Not all methods are appropriate for each Instance Variable type. For example, a setOn method is intended for manipulating Boolean Instance Variables and is therefore undefined for an Instance Variable of the character-string type.

"Coupled for data communications" means any form of data communications, wireless, 802.11b, BLUETOOTH, infrared, radio, internet protocols, HTTP protocols, email protocols, networked, direct connections, dedicated phone lines, dial-ups, serial connections with RS-232 (EIA232) or Universal Serial Buses, hard-wired parallel port connections, network connections according to the Power Line Protocol, and other forms of connection for data communications as will occur to those of skill in the art. Couplings for data communications include networked couplings for data communications. Examples of networks useful with various embodiments of the invention include cable networks, intranets, extranets, internets, local area networks, wide area networks, and other network arrangements as will occur to those of skill in the art. The use of any networked coupling among television channels, cable channels, video providers, telecommunications sources, and the like, is well within the scope of the present invention.

"HAVi" stands for 'Home Audio Video interoperability,' the name of a vendor-neutral audio-video standard particularly for home entertainment environments. HAVi allows different home entertainment and communication devices (such as VCRs, televisions, stereos, security systems, and video monitors) to be networked together and controlled from one primary device, such as a services gateway, PC, or television. Using IEEE 1394, the 'Firewire' specification, as the interconnection medium, HAVi allows products from different vendors to comply with one another based on defined connection and communication protocols and APIs. Services provided by HAVi's distributed application system include an addressing scheme and message transfer, lookup for discovering resources, posting and receiving local or remote events, and streaming and controlling isochronous data streams.

"HomePlug" stands for The HomePlug Powerline Alliance. HomePlug is a not-for-profit corporation formed to provide a forum for the creation of open specifications for high speed home powerline networking products and services. The HomePlug specification is designed for delivery of Internet communications and multimedia to homes through the home power outlet using powerline networking standards.

The HomePlug protocol allows HomePlug-enabled devices to communicate across powerlines using Radio Frequency signals (RF). The HomePlug protocol uses Orthogonal Frequency Division Multiplexing (OFDM) to split the RF signal into multiple smaller sub-signals that are then transmitted from one HomePlug enabled-device to another HomePlug-enabled device at different frequencies across the powerline.

"HTTP" stands for 'HyperText Transport Protocol,' the standard data communications protocol of the World Wide Web.

"ID" abbreviates "identification" as used by convention in this specification with nouns represented in data elements, so that 'user ID' refers to a user identification and 'userID' is the name of a data element in which is stored a user identification.

"LAN" is an abbreviation for "local area network." A LAN is a computer network that spans a relatively small area. Many LANs are confined to a single building or group of buildings. However, one LAN can be connected to other LANs over any distance via telephone lines and radio waves. A system of LANs connected in this way is called a wide-area network (WAN). The Internet is an example of a WAN.

"LonWorks" is a networking platform available from Echelon™. Lon Works is currently used in various network applications such as appliance control and lighting control. The LonWorks networking platform uses a protocol called "LonTalk" that is embedded within a "Neuron Chip" installed within Lon Works-enabled devices.

The Neuron Chip is a system-on-a-chip with multiple processors, read-write and read-only memory (RAM and ROM), and communication and I/O subsystems. The read-only memory contains an operating system, the LonTalk protocol, and an I/O function library. The chip has non-volatile memory for configuration data and for application programs, which can be downloaded over a LonWorks network to the device. The Neuron Chip provides the first 6 layers of the standard OSI network model. That is, the Neuron Chip provides the physical layer, the data link layer, the network layer, the transport layer, the session layer, and the presentation layer.

The Neuron Chip does not provide the application layer programming. Applications for LonWorks networks are written in a programming language called "Neuron C." Applications written in Neuron C are typically event-driven, and therefore, result in reduced traffic on the network.

"OSGI" refers to the Open Services Gateway Initiative, an industry organization developing specifications for services gateways, including specifications for delivery of service bundles, software middleware providing compliant data communications and services through services gateways. The Open Services Gateway specification is a java based application layer framework that gives service providers, network operator device makers, and appliance manufacturer's vendor neutral application and device layer APIs and functions.

"USB" is an abbreviation for "universal serial bus." USB is an external bus standard that supports data transfer rates of 12

Mbps. A single USB port can be used to connect up to 127 peripheral devices, such as mice, modems, and keyboards. USB also supports Plug-and-Play installation and hot plugging.

"WAP" refers to the Wireless Application Protocol, a protocol for use with handheld wireless devices. Examples of wireless devices useful with WAP include mobile phones, pagers, two-way radios, and hand-held computers. WAP supports many wireless networks, and WAP is supported by many operating systems. Operating systems specifically engineered for handheld devices include PalmOS, EPOC, Windows CE, FLEXOS, OS/9, and JavaOS. WAP devices that use displays and access the Internet run "microbrowsers." The microbrowsers use small file sizes that can accommodate the low memory constraints of handheld devices and the low-bandwidth constraints of wireless networks.

The "X-10" means the X-10 protocol. Typical X-10 enabled devices communicate across AC powerline wiring, such as existing AC wiring in a home, using an X-10 transmitter and an X-10 receiver. The X-10 transmitter and the X-10 receiver use Radio Frequency (RF) signals to exchange digital information. The X-10 transmitter and the X-10 receiver communicate with short RF bursts which represent digital information.

In the X-10 protocol, data is sent in data strings called frames. The frame begins with a 4 bit start code designated as "1110." Following the start code, the frame identifies a particular domain, such as house, with a 4 bit "house code," and identifies a device within that domain with a 4 bit "devices code." The frame also includes a command string of 8 bits identifying a particular preset command such as "on," "off," "dim," "bright," "status on," "status off," and "status request."

Exemplary Architecture

Exemplary methods, systems, and products for workflow decision management, are now explained with reference to the accompanying drawings, beginning with FIG. 1. FIG. 1 depicts an exemplary data processing system capable of workflow decision management according to embodiments of the present invention. The exemplary system of FIG. 1 includes a number of workflow decision management compliant devices capable of implementing workflow decision management according to embodiments of the present invention that are connected for data communications through a local area network ("LAN")(103). In the example of FIG. 1, the exemplary workflow decision management compliant devices include a personal digital assistant ("PDA") (112), a computer workstation (104), a personal video recorder (108), a server (110), personal computer (102), a thermostat (114), a laptop (116), a desk lamp (118), a compact disc player (120), and a telephone (109) are coupled for data communications through a LAN. The network connection aspect of the architecture of FIG. 1 is only for explanation, not for limitation. In fact, systems for workflow decision management according to embodiments of the present invention may implemented with LANs, WANs, intranets, internets, the Internet, webs, the World Wide Web itself, or other connections as will occur to those of skill in the art. Such networks are media that may be used to provide data communications connections between various devices and computers connected together within an overall data processing system.

In the example of FIG. 1, the PDA (112) is coupled for data communications to the LAN (103) through a wireless link (124). The Workstation (104), the server (110), the personal computer (102), the laptop (116), and the telephone (109) are coupled for data communications to the LAN through twisted pair wireline connections (126, 130, 132, 136, 122). The personal video recorder (108) and the compact disc player (120) are coupled for data communications to the LAN through a coaxial cable wireline connection (128, 140). The thermostat (114) and the desk lamp (118) are coupled for data communications to the LAN through a powerline connection (134, 138).

The exemplary devices of FIG. 1 are capable of reporting current values of supported device attributes and the exemplary devices of FIG. 1 are also capable of receiving messages from other devices instructing the device to change values of supported attributes. The exemplary system of FIG. 1 is capable generally of maintaining a device state history; identifying a device usage pattern in dependence upon the device state history; and identifying a derived scenario in dependence upon the device usage pattern. The exemplary devices of FIG. 1 are also capable of identifying a workflow in dependence upon the derived scenario and executing the workflow in dependence upon a predetermined tolerance. The exemplary devices of FIG. 1 are also capable of executing the workflow by sending a message to a device to administer at least one value of an attribute of the device and logging the message.

A device state history is a data structure containing the history of the values of one or more attributes of one or more devices. In the example of FIG. 1, each device may maintain its own device state history and store the device history in computer memory installed on the device or single device state history of all the devices in the network may be maintained in computer memory accessible to application programming implementing workflow decision management that is installed on one or more devices.

A device usage pattern is typically implemented as a data structure representing a predetermined pattern of device usage for one or more devices. That is, a data structure representing a pattern of device usage. A device usage pattern may represent a pattern of usage of a single device or a pattern of usage of more than one device. The system of FIG. 1 typically identifies a device usage pattern in dependence upon the device state history by searching a plurality of stored device usage records for a device usage record that matches recent entries in the device state history.

The system of FIG. 1 is also capable of identifying a derived scenario in dependence upon the identified device usage pattern. A derived scenario is typically implemented as a data structure representing a particular state of devices in a networked environment. Derived scenarios are created in dependence upon actual past device usage within the networked environment and such derived scenarios often represent scenarios of device usage of more than one device. The system of FIG. 1 typically identifies a derived scenario by retrieving a derived scenario ID from a derived scenario table in dependence upon the identified device usage pattern ID.

The system of FIG. 1 is also capable of identifying a workflow in dependence upon the derived scenario and executing the workflow. A workflow is software implementing a device controlling action that when executed changes the values of one or more attributes of one or more devices. Executing workflows typically includes calling member methods in a CAL object for a device, downloading an OSGi bundle to a device, calling member methods in a device class, sending a message to a device, or any other method of executing a workflow as will occur to those of skill in the art.

Figure 2:
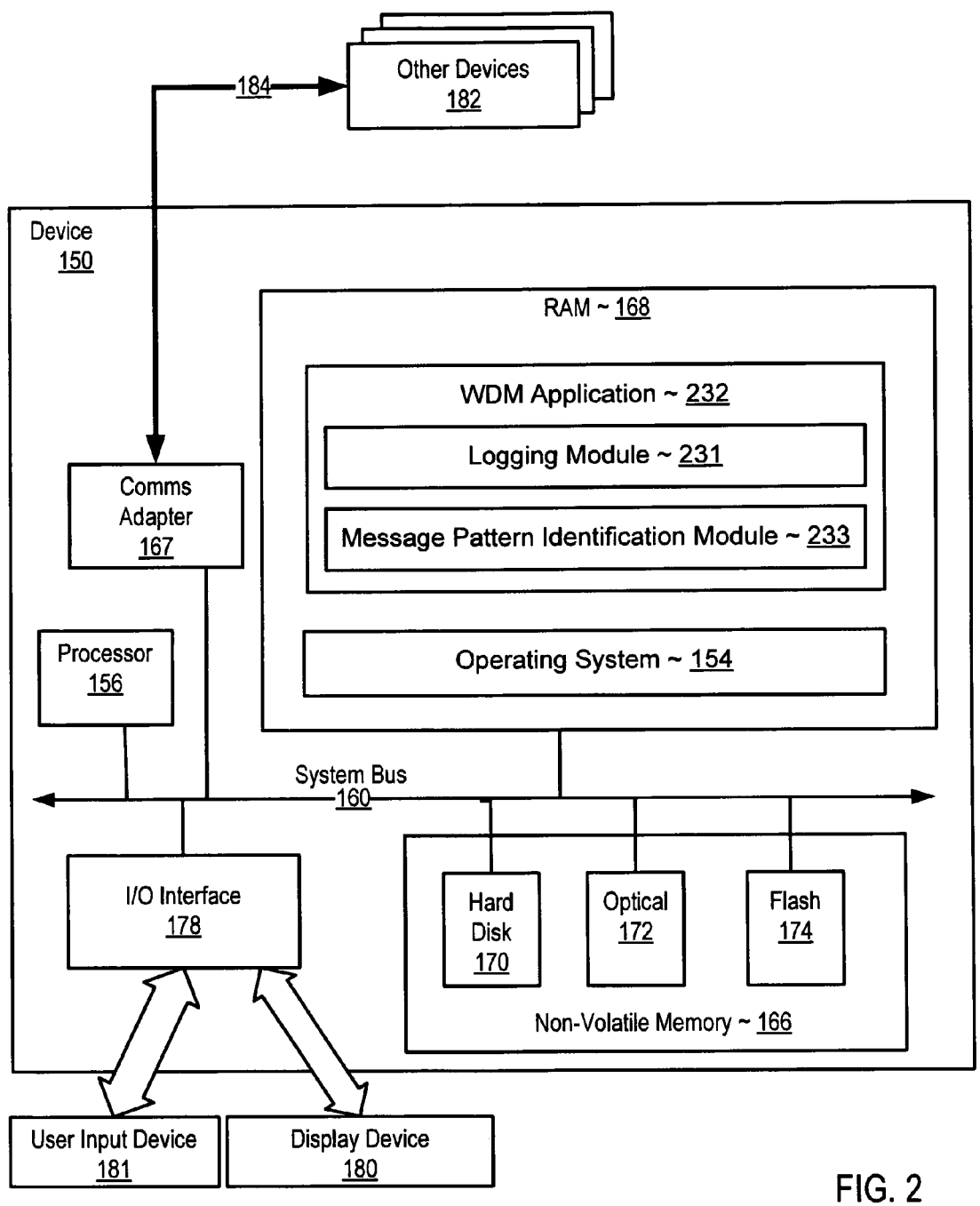
FIG. 2 sets forth a block diagram of an exemplary device useful in implementing workflow decision management according to embodiments of the present invention.
Figure 2A:
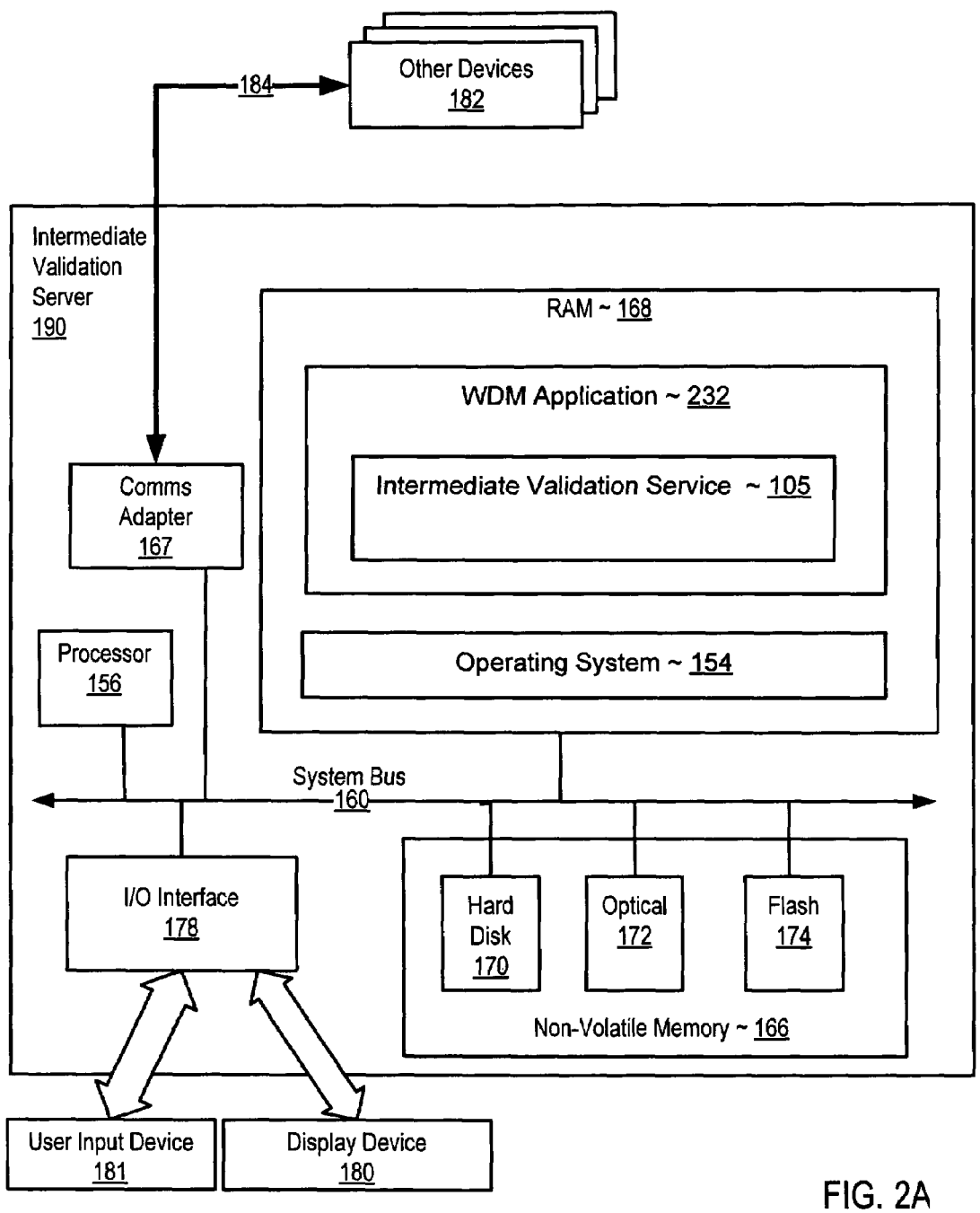
FIG. 2A sets forth a block diagram of an exemplary intermediary validation server useful in implementing workflow decision management according to embodiments of the present invention.

The system of FIG. 1 also includes an intermediate message validation service (105) running on an intermediate validation server (190 of FIG. 2A). The intermediate message validation service (105) of FIG. 1 is capable generally of receiving, to an intermediate message validation service, a message to be forwarded to a device to administer at least one value of an attribute of the device; determining, by the intermediate message validation service, whether the message is invalid; terminating, by the intermediate message validation service if the message is invalid; and forwarding the message to the device if the message is valid.

The arrangement of devices making up the exemplary system illustrated in FIG. 1 is for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example, CEBus, X-10, LonTalk, HomePlug, HAVi, TCP/IP, HTTP, WAP, and others as will occur to those of skill in the art. Various embodiments of the present invention may also be implemented in various computer environments such as for example CEBus, OSGi, and others that will occur to those of skill in the art. Although much of the present specification describes exemplary embodiments of the present invention with particular reference to CEBus, the such descriptions are for explanation not for limitation. In fact, many environments and frameworks support workflow decision management according to the present invention such as, for example, CEBus, HAVi, HomePlug, LonWorks, X-10, OSGi, as well as others that will occur to those of skill in the art, and all such environments and frameworks are within the scope of the present invention.

Workflow decision management in accordance with the present invention is generally implemented with automated computing machinery installed on one or more workflow decision management compliant devices. For further explanation, FIG. 2 sets forth a block diagram of an exemplary device (150) useful in implementing workflow decision management according to embodiments of the present invention. The device (150) of FIG. 2 includes at least one computer processor (156) or 'CPU' as well as random access memory (168) ("RAM"). Stored in RAM (168) is an operating system (154). Operating systems useful in computers according to embodiments of the present invention include Unix, Linux, Microsoft XP™, and many others as will occur to those of skill in the art. Operating system (154) in the example of FIG. 2 is shown in RAM (154), but many components of an operating system typically are stored in non-volatile memory (166) also.

Also stored in RAM is a workflow decision management application (232). The workflow decision management application is application computer programming generally capable of maintaining a device state history; identifying a device usage pattern in dependence upon the device state history; and identifying a derived scenario in dependence upon the device usage pattern. The derived scenario typically has a tolerance governing the execution of workflows. The exemplary devices of FIG. 2 are also capable of identifying a workflow in dependence upon the derived scenario; and executing the workflow. Methods of workflow decision management in accordance with the present invention can be implemented using many programming languages including CAL, OSGi, Java, C++, Smalltalk, C, Pascal, Basic, COBOL, Fortran, and so on, as will occur to those of skill in the art.

The workflow decision management application (232) is also generally capable of maintaining a device state history; identifying a device usage pattern in dependence upon the device state history; identifying a workflow scenario in dependence upon the device usage pattern; identifying a workflow in dependence upon the workflow scenario; and executing the workflow including sending a message to a device to administer at least one value of an attribute of the device.

The exemplary workflow decision management application (232) of FIG. 2 also includes a logging module (231). The logging module (231) includes computer program instructions capable of logging the message by recording in a message log message information describing the message sent to the device.

The exemplary workflow decision management application (232) also includes a message pattern identification module (233). The message pattern identification module (233) includes computer program instructions capable of identifying a message pattern in dependence upon a plurality of messages sent to a device by data mining a message log including message information describing the message sent to the device.

The device (150) of FIG. 2 includes non-volatile computer memory (166) coupled through a system bus (160) to processor (156) and to other components of the device (150). Non-volatile computer memory (166) may be implemented as a hard disk drive (170), optical disk drive (172), electrically erasable programmable read-only memory space (so-called 'EEPROM' or 'Flash' memory) (174), RAM drives (not shown), or as any other kind of computer memory as will occur to those of skill in the art.

The exemplary device (150) of FIG. 2 includes a communications adapter (167) for implementing connections for data communications (184), including connections through networks, to other workflow management compliant devices (182), including servers, other workflow management client devices, and others as will occur to those of skill in the art. Communications adapters implement the hardware level of connections for data communications through which local devices and remote devices or servers send data communications directly to one another and through networks. Examples of communications adapters useful for workflow decision management according to embodiments of the present invention include modems for wired dial-up connections, Ethernet (IEEE 802.3) adapters for wired LAN connections, and 802.11b adapters for wireless LAN connections.

The example device of FIG. 2 includes one or more input/output interface adapters (178). Input/output interface adapters in workflow management compliant devices implement user-oriented input/output through, for example, software drivers and computer hardware for controlling output to display devices (180) such as computer display screens, as well as user input from user input devices (181) such as keyboards and mice.

Workflow decision management in accordance with the present invention is also capable of intermediate message validation. For further explanation, FIG. 2A sets forth a block diagram of an exemplary intermediary validation server (190) useful in implementing workflow decision management according to embodiments of the present invention. The intermediary validation server (190) of FIG. 2A includes at least one computer processor (156) or 'CPU' as well as random access memory (168) ("RAM"). Stored in RAM (168) is an operating system (168). Operating systems useful in computers according to embodiments of the present invention include Unix, Linux, Microsoft XP™, and many others as will occur to those of skill in the art. Operating system (154) in the example of FIG. 2A is shown in RAM (154), but many components of an operating system typically are stored in non-volatile memory (166) also.

Also stored in RAM is a workflow decision management application (232). The workflow decision management application includes an intermediate validation service (105), computer program instruction capable generally of receiving, to an intermediate message validation service, a message to be forwarded to a device to administer at least one value of an attribute of the device; determining, by the intermediate message validation service, whether the message is invalid; and terminating, by the intermediate message validation service if the message is invalid and forwarding the message to the device if the message is valid.

The intermediary validation server (190) of FIG. 2A includes non-volatile computer memory (166) coupled through a system bus (160) to processor (156) and to other components of the intermediary validation server (190). Non-volatile computer memory (166) may be implemented as a hard disk drive (170), optical disk drive (172), electrically erasable programmable read-only memory space (so-called 'EEPROM' or 'Flash' memory) (174), RAM drives (not shown), or as any other kind of computer memory as will occur to those of skill in the art.

The exemplary intermediate validation server (190) of FIG. 2A includes a communications adapter (167) for implementing connections for data communications (184), including connections through networks, to other workflow management compliant devices (182), including servers, other workflow management client devices, and others as will occur to those of skill in the art. Communications adapters implement the hardware level of connections for data communications through which local devices and remote devices or servers send data communications directly to one another and through networks. Examples of communications adapters useful for workflow decision management according to embodiments of the present invention include modems for wired dial-up connections, Ethernet (IEEE 802.3) adapters for wired LAN connections, and 802.11b adapters for wireless LAN connections.

The example intermediary validation server of FIG. 2A includes one or more input/output interface adapters (178). Input/output interface adapters in workflow management compliant devices implement user-oriented input/output through, for example, software drivers and computer hardware for controlling output to display devices (180) such as computer display screens, as well as user input from user input devices (181) such as keyboards and mice.

Exemplary Data Structures and Relations Among Data Structures

FIGS. 3 and 4 are block diagrams illustrating exemplary data structures useful in implementing methods of workflow decision management according to aspects of the present invention. In this specification, the terms "field" and "data element," unless the context indicates otherwise, generally are used as synonyms, referring to individual elements of digital data. Aggregates of data elements are referred to as "records" or "data structures." Aggregates of records are referred to as "tables" or "files." Aggregates of files or tables are referred to as "databases."

The example of FIG. 3 includes a device record (150) that represents a workflow decision management compliant device in accordance with the present invention. The exemplary device record (150) includes a device ID field (302) uniquely identifying the device. The exemplary device record (150) also includes an address field (304) containing the network address of the device. The exemplary device record (150) includes an attribute field (306). The attribute field contains the value of a particular attribute of a device indicating a device state such as on, off, a volume setting, and so on. Although only one attribute field is shown in the example of FIG. 3, this for simplicity of explanation. Many workflow decision management compliant devices support more than one attribute as will occur to those of skill in the art.

The example of FIG. 3 includes an exemplary device state record (330) that represents the allowable device states of a particular device. The device state record includes a device ID field (302) uniquely identifying the device for which the device state record represents acceptable device states. The device state record (330) also includes a device state ID field (316) uniquely identifying the device state. The device state record (330) also includes a description field (328) containing a description of the acceptable states or attribute values of the device.

The example of FIG. 3 includes a devices state history (314). The device state history is a data structure containing the history of the state of one or more devices. That is, the current as well as past values of attributes of a device. Records in the exemplary device state history (314) include a device ID (302) uniquely identifying the device for which the device state is recorded. Records of the exemplary device state history also include a device state ID field (316) uniquely identifying acceptable device states for the device. Records of the exemplary device state history (314) include a value field (318) containing the value of a particular attribute of the device. As stated above, typical devices support more than one attribute and therefore typical records of device state histories include a plurality of value fields containing the values of the supported attributes. Records of the exemplary device state history include a time stamp field (320) containing date and time information identifying the date and time that a particular device attribute of a particular device had a particular value.

The example of FIG. 3 includes a device usage record (328) that represents a predetermined pattern of device attributes for a device. That is, a device usage is a data structure used to identify whether the states of the devices in a particular networked environment conform to a predetermined pattern. To determine whether the state of current devices in a particular networked environment conform to a predetermined pattern, recent entries in the device state history compared with a plurality of device usage. If the comparison results in a match, it is inferred that the state of the devices in the particular networked environment conform to a predetermined pattern.

The exemplary devices usage (328) includes a usage ID (331) uniquely identifying a particular predetermined pattern of device usage. The exemplary device usage of FIG. 3 includes a device ID (302) uniquely identifying a particular device. The device usage (328) also includes a device state ID (316) uniquely identifying the acceptable device states for the particular device. The exemplary device usage (328) includes a value field (318) containing the value of a particular supported attribute of the device.

The example of FIG. 3 includes a usage record (332) that identifies and describes a particular pattern of device usage in the networked environment. The usage record (332) includes usage ID (334) that uniquely identifies the pattern of device usage, and a description field (336) that contains a description of the pattern of device usage represented by the usage record (332).

The example of FIG. 3 includes a scenario record (344) that represents a particular scenario of device usage consistent with an identified predetermined device usage pattern. Scenarios (344) are predetermined and predefined generally from many users in many networked environments. That is, such scenarios are not created from the actual device usage in the networked domain in which they are implemented. When the current states of a device conform to a predetermined pattern of device usage, the current states of a device may also conform to one of a plurality of scenarios. The exemplary scenario record (344) of FIG. 3 includes a scenario ID field (346) uniquely identifying the scenario. The exemplary scenario record (344) of FIG. 3 includes a workflow ID (340) identifying a workflow for execution when the current device states in a particular networked environment identify a scenario. Although the scenario record of FIG. 3 includes a single workflow ID field, this for simplicity of explanation, not for limitation. In many embodiments of the present invention, a particular scenario supports the execution of more than one workflow. The scenario (344) of FIG. 3 also contains a description field (350) that contains a description of the scenario.

The example of FIG. 3 includes a workflow record (338) that represents a particular device controlling action or a set of device controlling actions. A workflow is software implementing a device controlling action that when executed changes the values of one or more attributes of one or more devices in accordance with the present invention. The exemplary workflow record (338) includes a workflow ID (340) uniquely identifying the workflow. The exemplary workflow record (338) of FIG. 3 also includes a sequence field (342) whose value is used to execute this workflow in a particular sequence of execution of a plurality of workflows. That is, when more than one workflow is executed for a scenario, the value of the sequence field is used to sequence the execution of the plurality of workflows. Workflows can be implemented using CAL, OSGi, Java, C++, Smalltalk, C, Pascal, Basic, COBOL, Fortran, and so on, as will occur to those of skill in the art.

The example of FIG. 3 includes a workflow session (362) that represents an instance of an executed workflow. The exemplary workflow session (362) includes a workflow session ID (364) uniquely identifying the workflow session and a workflow ID (340) identifying the executed workflow. The exemplary workflow session also includes a user session state ID (366) uniquely identifying the particular user session for which the workflow is executed. The exemplary workflow session also includes a message ID (368) identifying a message sent to a device to effect the workflow. That is, the message sent to a device instructing the device to change the value of a particular attribute. Sending such messages to the device, in some embodiments, effect changes in device status and therefore, carry out the workflow. The exemplary workflow session (362) includes a user ID (370) identifying the user on whose behalf the workflow is executed and a role ID field (372) identifying the security role of the user.

The example of FIG. 3 includes a derived scenario (352) that represents a particular scenario of device usage in the networked domain. Derived scenarios are created in dependence upon the actual device usage within the networked environment. Derived scenarios (352) have two important distinctions from scenarios (344). First, the derived scenarios are created in dependence upon the device usage of the devices within the networked environment and therefore reflect scenarios of device usage of the particular networked environment from which they are derived rather than canned or off the shelf scenarios. Second, derived scenarios have an associated tolerance (360) which is a rule set that governs the execution of workflows executed in dependence upon identifying the derived scenario.

The exemplary derived scenario (352) of FIG. 3 includes a derived scenario ID field (354) uniquely identifying the derived scenario. The exemplary derived scenario (352) of FIG. 3 includes a tolerance ID (356) identifying an associated tolerance for the derived scenario. The derived scenario (352) of FIG. 3 also includes a workflow ID (340) to be executed with the state of devices in the networked environment identify the derived scenario. The workflow is executed in dependence upon the associated tolerances of the derived scenario. The derived scenario (352) record contains a description field (358) containing a description of the derived scenario.

The example of FIG. 3 includes a tolerance record (360) that represents a rule set governing the execution of a workflow executed in dependence upon an identified derived scenario. Often a tolerance is a subset of the range of acceptable attribute values that a device supports. For example, a thermostat may support attribute values that if set will eventually damage either the thermostat itself or other devices. A tolerance is therefore often designed to govern the execution of workflows such that device usage is not harmful to devices within the networked environment. The exemplary tolerance (360) of FIG. 3 includes a tolerance level ID field (362) uniquely identifying the tolerance.

The example of FIG. 3 includes a device threshold record (308) that represents the threshold minimum and threshold maximum attribute values that device will support. The exemplary device threshold record (308) of FIG. 3 includes a device ID (302) identifying the device for which the thresholds are valid. The exemplary device threshold record also includes MAX field (310) containing the maximum attribute value that the device will support and a MIN field (312) that includes the minimum attribute value that the device will support.

The example of FIG. 3 includes a user record (374) representing a user for which workflows are performed to affect device status. Users according to aspects of workflow decision management of the present invention are not limited to human users, but also include processes as will occur to those of skill in the art. The exemplary user record (374) of FIG. 3 includes a user ID (376) uniquely identifying the user and a role ID (378) uniquely representing the role of the user. A role is security role for the user such as a systems administrator, a guest, and so on.

The example of FIG. 3 also includes a user session state (382) that represents a session for a user. A session for a user indications current workflow decision management being executed on the user's behalf. The user session state (382) of FIG. 3 includes a session state ID (384) that uniquely identifies the user session state and a message ID (386) that identifies a message sent to give effect to a particular workflow identified in a workflow session and executed on behalf of the user. The user session state also includes a user ID (376) identifying the user on whose behalf the workflow is executed and a role ID (378) identifying the role of the user.

FIG. 4 is a block diagram of more data structures useful in workflow decision management according to embodiments of the present invention. The example of FIG. 4 includes a role record (402) that represents a security role for a user. The exemplary role record (402) of FIG. 4 includes a role ID (378) that uniquely identifies a security role.

The example of FIG. 4 includes a role device privileges record (404) that representing the privileges assigned to a particular role for a device. For example, some security roles have only limited access to some devices. The role device privileges record (404) includes a role privileges ID field (406) uniquely identifying the role device privileges. The exemplary role device privileges record (404) of FIG. 4 includes a privileges ID (408) identifying an allowable privilege and a role ID (378) identifying a particular security role having the privilege.

The example of FIG. 4 includes a privilege record (402) representing a particular privilege. The exemplary privilege record (402) includes a privilege ID field (408) identifying the privilege and a description field (410) containing a description of the privilege. The exemplary privilege record (402) includes a read flag (412) and a write flag (414) containing a Boolean indication of read and write privileges.

The example of FIG. 4 includes a message record (416) representing a message. The message record (416) includes a message ID field (386) uniquely representing the message. The example message (416) of FIG. 4 also includes an origin address field (418) containing the network address of the device originating the message and a destination address field (420) containing the network address of the device receiving the message. The message record (416) of FIG. 4 also includes a message log ID (722) representing the message log having an entry representing the message. The message record (416) of FIG. 4 also includes a message validator ID field (992) identifying a message validator such as a message validation service to determine whether the message is valid or invalid.

The example of FIG. 4 includes a device privilege record (422) that represents an available privilege appropriate for a device. The exemplary device privilege record (422) of FIG. 4 includes a device privilege ID (424) uniquely identifying the device privilege and a device ID (302) identifying the device. The exemplary device privilege record (422) includes a privilege ID (406) identifying an privilege appropriate for the device.

The example of FIG. 4 includes a data structure representing a message bridge (450). A message bridge is hardware designed for routing messages to one or more devices in a networked environment. Examples of devices which may be represented as message bridges include routers, gateways, and other devices as will occur to those of skill in the art.

The example of FIG. 4 includes an exemplary message log (722). A message log (722) is a data structure containing entries representing individual messages sent to one or more devices in the networked environment. Entries in the exemplary message log (722) include a message log ID (724) uniquely identifying the message log and a message ID (725) uniquely identifying the message represented by an entry in the log. Entries in the message log also include the contents of the message (726) and the time message was sent (762). Message logs usefully provide a record of the messages sent to device effecting the execution of workflows according to the present invention.

The example of FIG. 4 includes a message pattern record (460). A message pattern record (460) represents an identified message pattern. The entries in the message pattern record (460) include a message pattern ID (462) uniquely identifying the message pattern. Entries in the message pattern record (460) also include a message type (464) identifying a type of message sent to a device and the device ID (465) identifying the device to which the message is sent. Entries in the message pattern record also include the attributes (463) of the message defining the device controlling instruction contained in the message and a message sequence ID (466) identifying the position in the message pattern in which the particular message resides.

The example of FIG. 4 includes a message validator (990) record representing a message validation service. The message validator (990) record of FIG. 4 includes a validator ID field (992) uniquely identifying the message validation service. The message validator (992) also includes a dead message queue ID (994) identifying a dead message queue for storage of invalid messages and a message log ID (724) for storage of valid massages.

The example of FIG. 4 includes a dead message queue (996). A dead message queue (996) is a data structure containing entries representing individual invalid messages sent to one or more devices in the networked environment, determined to be invalid by an intermediary validation service and terminated by the intermediate validation service. Entries in the dead message queue (996) include a dead message queue ID (994) uniquely identifying the dead message queue and a message ID (725) uniquely identifying the invalid message represented by an entry in the log. Entries in the dead message queue include the contents of the message (726) and the time message was sent (762).

Figure 5:
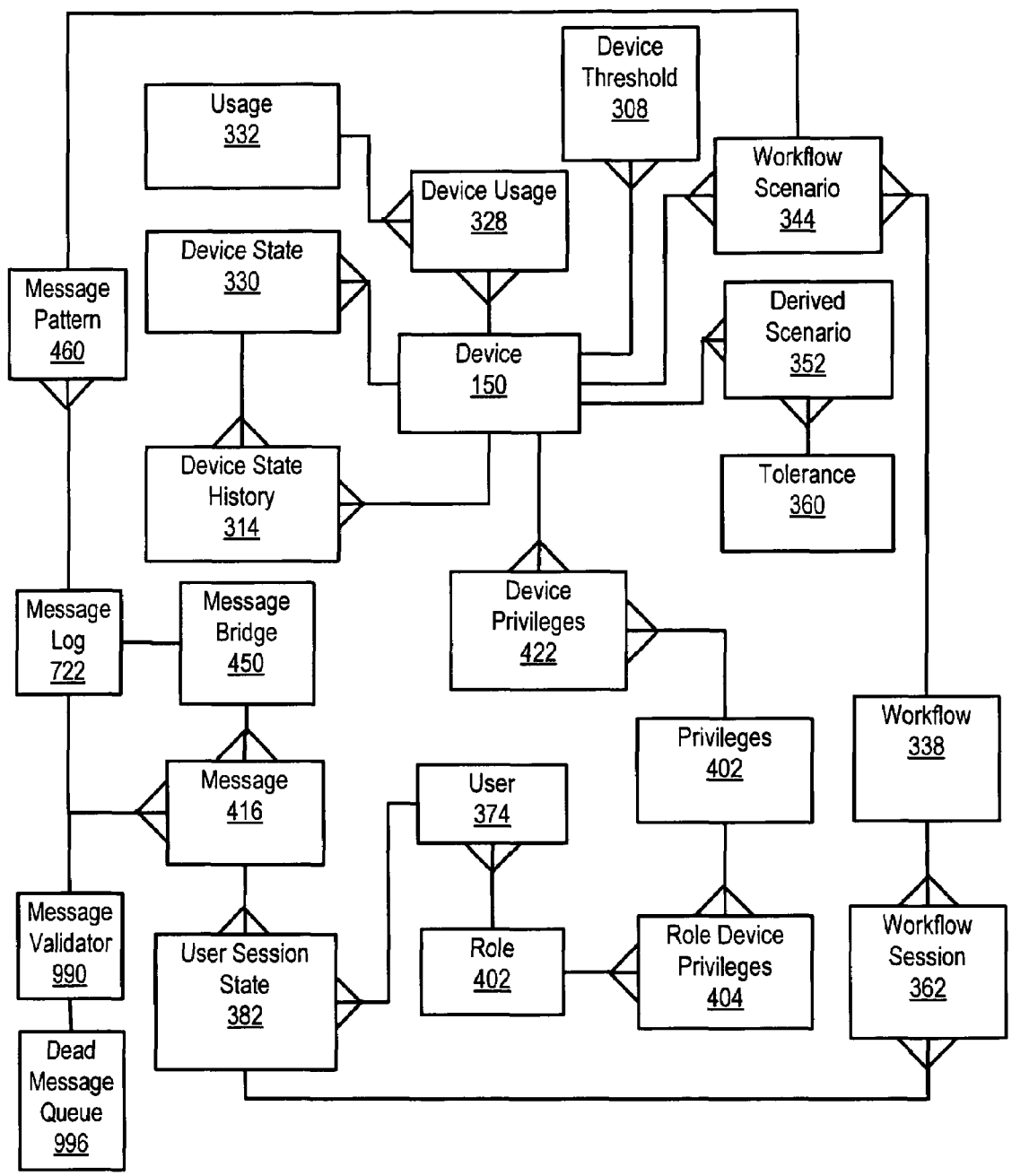

FIG. 5 sets forth a block diagram illustrating an exemplary relationship among the data structures of FIGS. 3 and 4. In the example of FIG. 5, the device record is related one-to-many to the identified device usage record (328) through the device ID field (302 on FIG. 3) used as a foreign key. The identified device usage record (328) is related many-to-one to the usage record (332) through the usage ID field (330 on FIG. 3) used as a foreign key. The device record (150) is related one-to-many to the device threshold record (308) through the device ID field (302 on FIG. 3) used as a foreign key.

In the example of FIG. 5, the device record (150) is related one-to-many to the device state record (330) through the device ID field (302 on FIG. 3) used as a foreign key. The device state record (330) is related one-to-many to the device state history record (314) through the device state ID field (316 on FIG. 3) used as a foreign key. The device state history record (314) is related many-to-one to the device record (150) through the device ID field (302 on FIG. 3) used as a foreign key.

In the example of FIG. 5, the device record (150) is related one-to-many to the scenario record (344) through the device ID field (302 on FIG. 3) used as a foreign key. The scenario record (344) is related many-to-one to the workflow record (338) through a workflow ID field (340 on FIG. 3) used as a foreign key. The workflow record (338) is related one-to-many to the workflow session (362) through the workflow ID field (340 on FIG. 3) used as a foreign key.

In the example of FIG. 5, the device record (150) is related one-to-many to the derived scenario record (352) through the device ID field (302 on FIG. 3) used as a foreign key. The derived scenario record (352) is related many-to-one to the tolerance record (360) through the derived scenario ID field (354 on FIG. 3) used as a foreign key.

In the example of FIG. 5 the device record (150) is related one to many with the device privileges record (422) through the device ID field (302 on FIG. 4) used as a foreign key. The device privileges record (422) is related many-to-one through to the privileges record (402) through the privilege ID field (406 on FIG. 4) used as a foreign key. The privileges record (402) is related one-to-many to the role device privileges record (404) through the privilege ID field (406 on FIG. 4) used as a foreign key. The role device privileges record (404) is related many-to-one to the role record (402) through a role field (378 on FIG. 4) used as a foreign key.

In the example of FIG. 5, the user record (374) is related many-to-one through to the role record (402) through the role ID field (378 on FIG. 4) used as a foreign key. The user record (374) is related to the user session state (382) one-to-many through the user ID field (376 on FIG. 3) used as a foreign key. In the example of FIG. 5, the user session state (382) is related many-to-one to the message record (416) through the message ID field (386 on FIG. 4) used as a foreign key. In the example of FIG. 5, the user session state (382) is related one-to-many to the workflow session (362) through the user session state ID (384 on FIG. 3) used as a foreign key.

In the example of FIG. 5, a message bridge (450) is related one-to-many to the message record (416) through the message ID field (386 on FIG. 4) used as a foreign key. The message record (416) is related many-to-one to the message log (722) through the message ID field (724 on FIG. 4) used as a foreign key. In the example of FIG. 5, the message pattern record (460) is related many-to-one with the message log (722) through a message log ID field (724 on FIG. 4) used as a foreign key. The message pattern record (460) is also related one-to-one to the workflow scenario record (344) through a message pattern ID field (462 on FIG. 3) used as a foreign key.

In the example of FIG. 5, a message validator (990) is related one-to-many to the message record (416) through the validator ID field (992 on FIG. 4) used as a foreign key. The message validator (990) is related one-to-one to the message log (722) through the message log ID field (724 on FIG. 4) used as a foreign key. The message validator (990) is related one-to-one to the dead message queue (996) through the dead message queue ID field (994 on FIG. 4) used as a foreign key.

Workflow Decision Management

Figure 6:
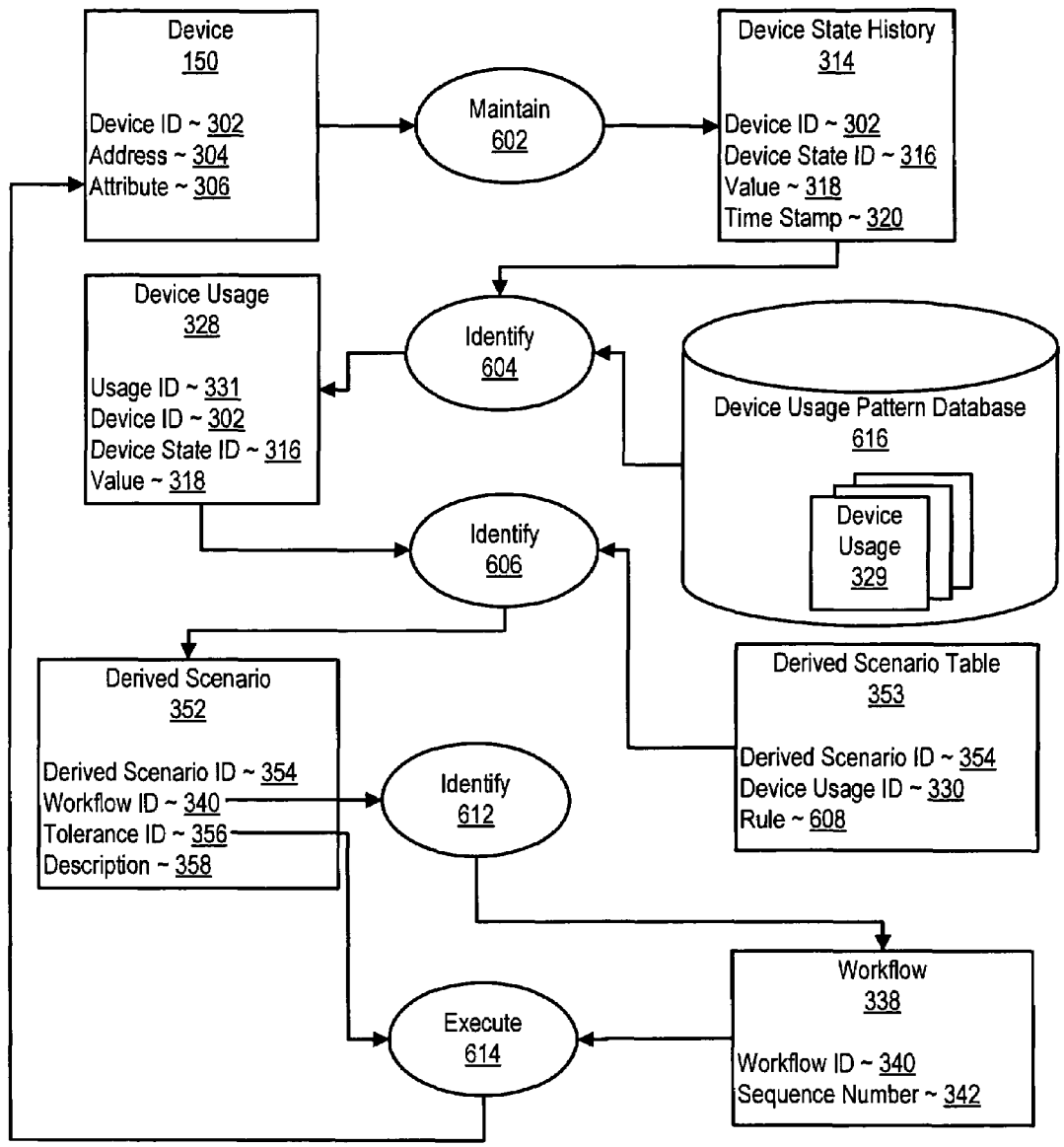
FIG. 6 sets forth a data flow diagram illustrating an exemplary method for workflow decision management.

FIG. 6 sets forth a data flow diagram illustrating an exemplary method for workflow decision management. The method of FIG. 6 includes maintaining (602) a device state history (314). As discussed above, the device state history is a data structure containing the history of the values of one or more attributes of one or more devices. A device state history for a single device can be maintained in computer memory on the device itself or a single device state history for many devices in the networked environment can be maintained in computer memory accessible to application programming implementing the method of FIG. 6.

In the method of FIG. 6, maintaining (602) a device state history (314) includes recording a plurality of attribute values (306) for a device (150). In the example of FIG. 6, each time an attribute value (306) of a device (150) is changed, the change is recorded by creating a new entry in a device state history. In some such embodiments, the latest entry in the device state history (314) represents the current state of the device. In some embodiments, workflow decision management devices are configured to report to application programming implementing a device state manager with each change in an attribute value and the device state manager creates a new entry in a device state history recording the change in attribute value.

The method of FIG. 6 also includes identifying (604) an identified device usage pattern (328) in dependence upon the device state history (314). As discussed above, a device usage record represents a predetermined pattern of device usage and includes a collection of device attribute values defining the device usage pattern. In the method of FIG. 6, identifying (604) an identified device usage pattern (328) in dependence upon the device state history (314) further comprises comparing the device state history (314) with a plurality of device usage patterns records (329). In the example of FIG. 6, a window of the entries of the device state history (314) representing recent device states are compared with device usage records (329) in a device usage pattern database (616) to identify a matching device usage record (328). If such a matching device usage record (328) exists, then it is inferred that the current state of devices within a networked environment conform to a device usage pattern represented by the record.

As will occur to those of skill in the art, in typical embodiments, the values of the entries in the device state history do not have to be exactly the same as the values of the device usage records to identify a matching device usage record. In fact, the values of the entries of the device state history will often not be the exactly the same as the values of the device usage records when a matching record is identified. The degree to which the values of the entries in the device state history must be similar to the values of the device usage records to be considered a match will vary according to factors such as tolerances and methods used to compare the device state history with the device usage records, predefined tolerances for identifying a match, as well as other numerous factors that will occur to those of skill in the art.

The method of FIG. 6 also includes identifying (606) a derived scenario (352) having an associated tolerance (356) in dependence upon the identified device usage pattern (328). As discussed above, a derived scenario (352) represents a particular scenario created in dependence upon actual device usage within the networked environment. Derived scenarios (352) have two important distinctions from other canned scenarios. First, the derived scenarios are created in dependence upon the actual past device usage of the devices within the networked environment and therefore reflect scenarios of device usage of the particular networked environment.

Second, in the example of FIG. 6, the derived scenarios (352) have an associated tolerance (356). A tolerance is a rule set governing the execution of workflows executed in dependence upon the identified derived scenario.

In the method of FIG. 6, identifying (606) a derived scenario (352) in dependence upon the identified device usage pattern (328) further comprises retrieving a derived scenario ID from a derived scenario table. In the example of FIG. 6 a derived scenario table (353) includes a plurality of derived scenario IDs (354) indexed by device usage IDs (330) identifying predefined device usage patterns. Identifying (606) a derived scenario (352) in dependence upon the identified device usage pattern (328) therefore includes retrieving a derived scenario ID from a derived scenario table in dependence upon the device usage ID (330) of the identified device usage record (328).

In the method of FIG. 6, identifying (606) a derived scenario (352) in dependence upon the identified device usage pattern (328) further comprises identifying a derived scenario (352) in dependence upon a rule (608). A rule (608) governs the identification of a particular derived scenario among a plurality of derived scenarios when more than one derived scenario associated with a single device usage pattern exists. Consider the example of a user cooking in a networked kitchen. The states of the devices in a living room match a device usage pattern that the user is cooking. However, more than one scenario corresponds with the device usage pattern as the user may be cooking breakfast, cooking lunch, or cooking supper. An exemplary rule identifying a scenario is: If time of day is between 4:30 p.m. and 7:30 p.m. and device usage pattern identifies a cooking scenario, then user is cooking supper.

The method of FIG. 6 also includes identifying (612) a workflow (338) in dependence upon the derived scenario (352). As discussed above, a workflow is software implementing a device controlling action that when executed changes the values of one or more attributes of one or more devices in accordance with the present invention. In the method of FIG. 6, identifying (612) a workflow (338) in dependence upon the derived scenario (352) comprises retrieving a workflow ID (340) from a derived scenario record (352).

The method of FIG. 6 also includes executing (614) the workflow (338) in dependence upon the tolerance (356). As discussed above, a tolerance represents a rule governing the execution of a workflow. Often a tolerance is a subset of the range of acceptable attribute values that a device supports. Such tolerances are often designed to prevent the execution of workflows from damaging devices within the networked environment.

Consider the following example. A networked home has a number of devices that are used to cool the west wing of the home. These devices include a fan, an air conditioner, and automatic shades. However, the automatic shades are currently not working and they currently will not close properly. Workflow decision management according to the present invention has identified a scenario within a home network demonstrating that the west wing of the home is too warm and therefore identifies and executes a workflow to cool the home that includes reducing the thermostat for the air conditioner, increasing fan speed and closing the automatic shades.

Because the automatic shades are not working properly, the workflow does not reduce the temperature in the west wing sufficiently and soon thereafter the scenario that the room is too hot is again identified. The same workflow is again identified and executed. By providing a tolerance for the execution of the workflow that defines a minimum tolerance value allowed for the thermostat, the air conditioner is spared from being overworked to the point of damage. That is, tolerances provide some boundaries for the execution of workflow preventing devices from being damaged by unforeseen problems with the execution of a workflow, such as in this case, the automatic shades not working properly. These tolerance values are often designed as a subset of the actual values that devices support. Such design advantageously recognizes that devices often support attribute values that will ultimately lead to damaging the device.

In the method of FIG. 6, executing (614) the workflow (338) in dependence upon the tolerance (356) further comprises sending a message to a device instructing the device to change the value of an attribute. In some such examples, a device receiving such a method can effect the change in value of the device by calling a member method in a device class representing the device such as, for example, SomeDeviceClass.setAtrribute( ) parameterized with an attribute value.

Workflow Decision Management With Message Logging

Logging messages sent to devices effecting one or more workflows may usefully provide a vehicle for identifying message patterns and message scenarios for workflow decision management. For further explanation, therefore, FIG. 7 sets forth a data flow diagram illustrating an exemplary method for workflow decision management that includes logging a message sent in the execution of a workflow. The method of FIG. 7 includes maintaining (702) a device state history (314). As discussed above, a device state history is a data structure containing the history of the values of one or more attributes of one or more devices. A device state history for a single device can be maintained in computer memory on the device itself or a single device state history for many devices in the networked environment can be maintained in computer memory accessible to application programming implementing the method of FIG. 7.

Figure 7:
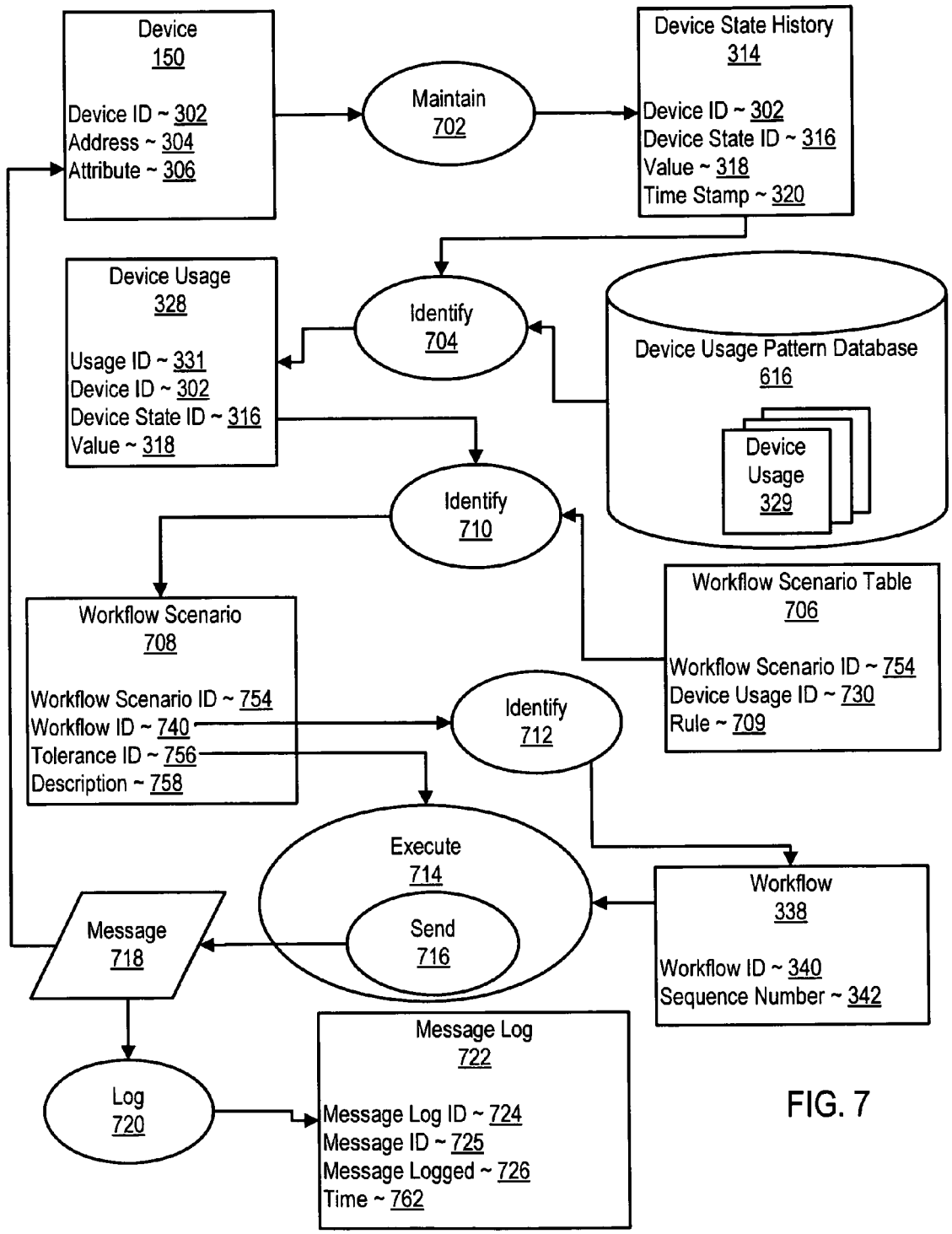
FIG. 7 sets forth a data flow diagram illustrating an exemplary method for workflow decision management that includes logging a message sent in the execution of a workflow.

In the method of FIG. 7, maintaining (702) a device state history (314) includes recording a plurality of attribute values for a device. As discussed above, each time an attribute value (306) of a device (150) is changed the change is recorded by creating a new entry in a device state history. In some such embodiments, the latest entry in the device state history (314) represents the current state of the device. In some embodiments, workflow decision management devices are configured to report to application programming implementing a device state manager with each change in an attribute value and the device state manager creates a new entry in a device state history recording the change in attribute value.

The method of FIG. 7 also includes identifying (704) a device usage pattern (328) in dependence upon the device state history (314). As discussed above, a device usage record represents a predetermined pattern of device usage and includes a collection of device attribute values defining the device usage pattern. In the method of FIG. 7, identifying (704) an identified device usage pattern (328) in dependence upon the device state history (314) further comprises comparing the device state history (314) with a plurality of device usage patterns records (329). In the example of FIG. 7, a window of the entries of the device state history (314) representing recent device states are compared with device usage records (329) in a device usage pattern database (616) to identify a matching device usage record (328). If such a matching device usage record (328) exists, then it is inferred that the current state of devices within a networked environment conform to a device usage pattern represented by the record.

As will occur to those of skill in the art, in typical embodiments, the values of the entries in the device state history do not have to be exactly the same as the values of the device usage records to identify a matching device usage record. In fact, the values of the entries of the device state history will often not be the exactly the same as the values of the device usage records when a matching record is identified. The degree to which the values of the entries in the device state history must be similar to the values of the device usage records to be considered a match will vary according to factors such as tolerances and methods used to compare the device state history with the device usage records, predefined tolerances for identifying a match, as well as other numerous factors that will occur to those of skill in the art.

The method of FIG. 7 also includes identifying (710) a workflow scenario (708) in dependence upon the device usage pattern (328). The workflow scenario of FIG. 7 may be either a scenario predetermined and predefined generally from many users in many networked environments, such as the scenario discussed above with reference to FIG. 3 given the reference number 344 or a derived scenario created in dependence upon the actual device usage within the networked environment discussed above with reference to FIG. 3 and given the reference number (352).

Identifying (710) a workflow scenario (708) in dependence upon the device usage pattern (328) may be carried out by retrieving a workflow scenario ID (754) from a workflow scenario table (706). In the example of FIG. 7, a workflow scenario table (706) includes a plurality of workflow scenario IDs (754) indexed by device usage IDs (730) identifying predefined device usage patterns. Identifying (710) a workflow scenario (708) in dependence upon the identified device usage pattern (328) therefore includes retrieving a workflow scenario ID (754) from a workflow scenario table in dependence upon the device usage ID (331) of the identified device usage record (328).

In the method of FIG. 7, identifying a workflow scenario (708) in dependence upon the device usage pattern (328) is carried out in further dependence upon a rule (709). A rule (709) governs the identification of a particular workflow scenario among a plurality of workflow scenarios when more than one workflow scenario associated with a single device usage pattern exists. Consider the example of a user cooking in a networked kitchen. The states of the devices in a living room match a device usage pattern that the user is cooking. However, more than one workflow scenario corresponds with the device usage pattern as the user may be cooking breakfast, cooking lunch, or cooking supper. An exemplary rule identifying a workflow scenario is: If time of day is between 4:30 p.m. and 7:30 p.m. and device usage pattern identifies a cooking scenario, then user is cooking supper.

The method of FIG. 7 also includes identifying (712) a workflow (338) in dependence upon the workflow scenario (708). As discussed above, a workflow is software implementing a device controlling action that when executed changes the values of one or more attributes of one or more devices in accordance with the present invention. In the method of FIG. 7, identifying (712) a workflow (338) in dependence upon the workflow scenario (708) includes retrieving a workflow ID (740) from a workflow scenario record (708).

The method of FIG. 7 also includes executing (714) the workflow (338) including sending (716) a message to a device to administer at least one value of an attribute of the device. As discussed above, a workflow is software implementing a device controlling action that when executed changes the values of one or more attributes of one or more devices in accordance with the present invention. Such software effects the device controlling action by sending a message to a device instructing the device to change the value of an attribute. A device receiving such a method can effect the change in value of the device by calling a member methods in a device class representing the device such as, for example, SomeDeviceClass.setAtrribute( ) parameterized with an attribute value sent in the message.

In the method of FIG. 7, executing (714) the workflow (338) also includes executing the workflow in dependence upon an associated tolerance (756). A tolerance is a rule set governing the execution of workflows executed in dependence upon the identified derived scenario. Often a tolerance is a subset of the range of acceptable attribute values that a device supports. For example, a thermostat may support attribute values that will if set will eventually damage either the thermostat itself or other devices. A tolerance is therefore often designed to govern the execution of workflows such that device usage is not harmful to devices within the networked environment.

The method of FIG. 7 also includes logging (720) the message (718). Logging (720) the message (718) according to the method of FIG. 7 is carried out by recording in a message log (722) message information. A message log (722) is a data structure containing entries representing individual messages sent to one or more devices in the networked environment. In the example of FIG. 7, the message log (722) contains the message information including a message log ID (724), a message ID (725), the contents of the message (726), and the time (762) message was sent.

Message logs usefully provide a record of the messages sent to device effecting the execution of workflows according to the present invention.

The message information included in the message log of FIG. 7 is for explanation and not for limitation. In fact, message information recorded in message logs will vary according to factors such as types of devices receiving the messages, message type, desired information concerning the message and other factors as will occur to those of skill in the art.

Figure 8:
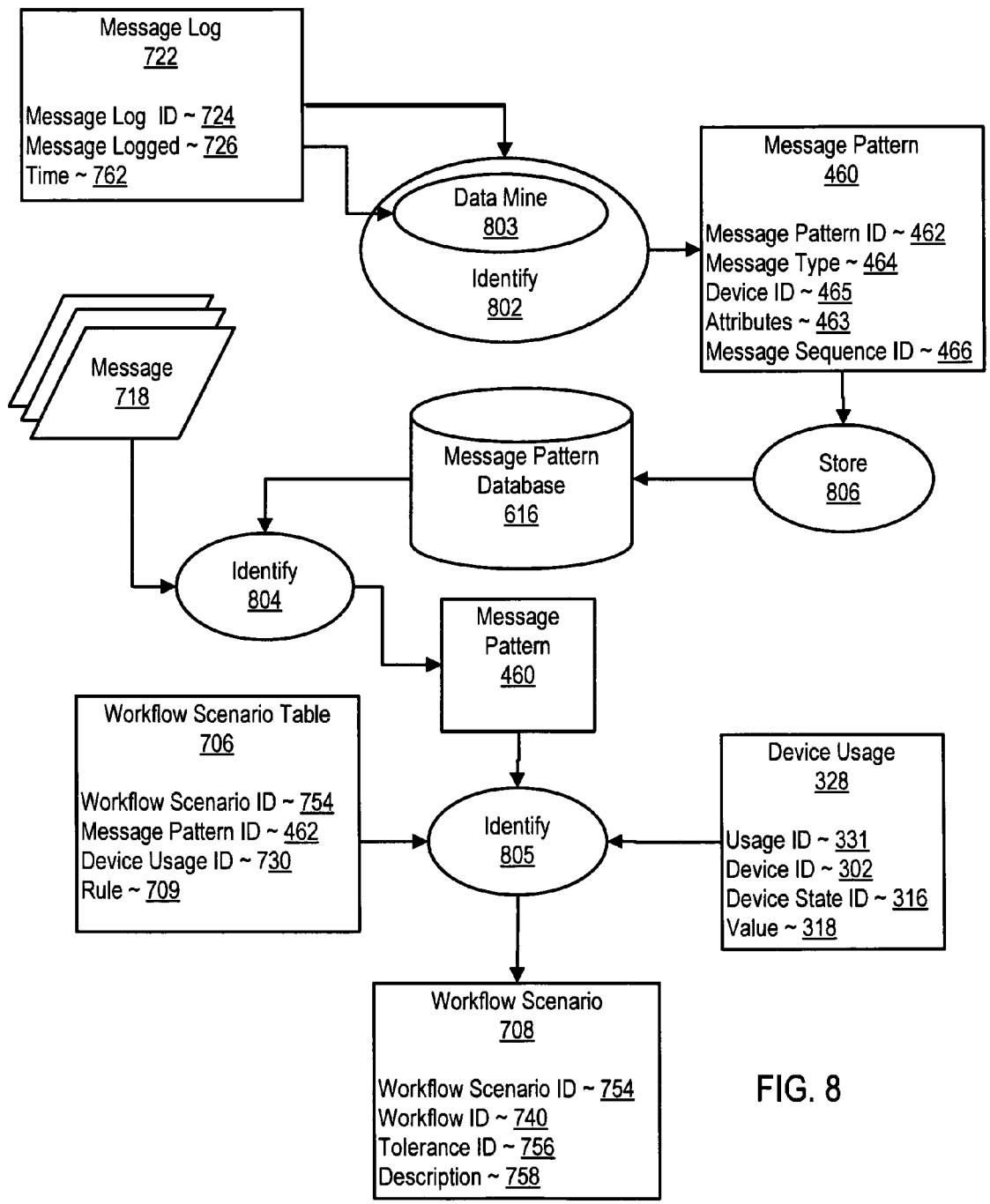
FIG. 8 sets forth a data flow diagram illustrating additional aspects of workflow decision management according to the present invention.

Message logs usefully provide a record of the messages sent to device effecting the execution of workflows according to the present invention. Such message logs may be used to identify patterns in the messages which themselves may be useful in identifying workflows for execution. For further explanation, therefore, FIG. 8 sets forth a data flow diagram illustrating additional aspects of workflow decision management according to the present invention. The method of FIG. 8 includes identifying (802) a message pattern (460) in dependence upon a plurality of messages sent to a device. In the example of FIG. 8, identifying (802) a message pattern (460) in dependence upon a plurality of messages sent to a device is carried out by identifying a message pattern from information contained within a message log recording information about a plurality of message sent to one or more devices. Identifying (802) a message pattern (460) may be carried out by a user examining the entries of a message log and discovering patterns in the entries of the message log.

Requiring a user to manually identify message patterns may be too labor intensive to be practicable. In the method of FIG. 8, therefore, identifying (802) a message pattern (460) in dependence upon a plurality of messages sent to a device is carried out by data mining (803) a message log (722) including message information describing messages to devices in the networked environment. There are many definitions for data mining. For the purpose of this specification, data mining means analyzing the recorded message information in the message log and discovering relationships, patterns, knowledge, or information from the recorded message information and using the discovered relationships, patterns or knowledge to identify message patterns for workflow decision management. Many data mining techniques typically include the steps of preparing the data for data mining, choosing an appropriate data mining algorithm, and deploying the data mining algorithm.

In the method of FIG. 8, the recorded message information in the message log has been prepared for data mining by providing a predetermined data structure for the message log. Typically, the predetermined data structure is provided when such a message log is created. The particular predetermined data structure for each particular kind of message log will vary depending on factors such as the type of messages being issued to devices to effect workflow decision management, the kind of message information available for logging and so on as will occur to those of skill in the art.

Data mining also typically includes choosing an appropriate data mining algorithm. An appropriate data mining algorithm for discovering message patterns will vary on many factors such as the type of message information recorded in the message log available to mine, the available computer software and hardware used to carry out the data mining, the size of the collection of the message information in the message log, or any other factor that will occur to those of skill in the art. Many data mining algorithms exist and all algorithms that appropriately find message patterns from a collection of message information recorded in a message log are within the scope of the present invention.

Although many data mining algorithms exist, many of the data mining algorithms share the same goals. Typical data mining algorithms attempt to solve the problem of being overwhelmed by the volume of data that computers can collect. Data mining algorithms also typically attempt to shield users from the unwieldy body of data by analyzing it, summarizing it, or drawing conclusions from the data that the user can understand.

One way of discussing various data mining algorithms is by discussing the functions that they perform rather than the specifics of their underlying mathematical operation. Another way of discussing various data mining algorithms is by describing "a rule" returned by the data mining algorithm. A rule is a description of the relationship, pattern, knowledge, or information found by the data mining algorithm. Exemplary data mining algorithms are explained in this specification by describing the functions they perform and the rules they return. The following examples of data mining algorithms are included in this specification for clarity of discussion, not for limitation. Any method of data mining that will occur to those of skill in the art, regardless of type, classification, or underlying mathematical operation, is within the scope of the present invention.

In some examples of the method of FIG. 8, identifying (802) a message pattern (460) includes data mining (803) a message log (722) with an association function. Association functions are typically used to find patterns having connected or related events. For example, in the context of identifying message pattern, data mining with association functions may return a rule such as "72% of the recorded messages to a thermostat were instructions to lower the thermostat and corresponded in time with messages to a ceiling fan to increase the speed of the ceiling fan." Data mining with an association function can be used to determine an association between the one or more fields of various entries in a message log. For example, an association function may return a rule describing that some percentage of messages to a thermostat are to reduce the setting of the thermostat.

In other examples of the method of FIG. 8, identifying (802) a message pattern (460) includes data mining (803) a message log (722) with sequential pattern operators. Data mining with sequential patterns is typically used in analyzing message information in a message log of a single type. A sequential pattern operator may be used to return a rule that describes a sequential relationship among entries in a message log to the same device. An example of a rule describing relationship among such entries in a message log is a rule that identifies that three messages to a thermostat in a row included instructions to raise the setting of the thermostat, thereby indicating that the temperature outside the area governed by the thermostat was dropping causing the area governed by the thermostat to drop.

In still other examples of the method of FIG. 8, identifying (802) a message pattern (460) includes data mining with a classification operator. A classification operator is applied to a set of entries in a message log that are organized or 'tagged' as belonging to a certain class, such as for example, recorded message information of messages sent at a certain time of day. A classification operator examines the set of tagged entries in a message log and produces a mathematical function that identifies the class. Such a classification operator can be used, for example, to analyze a class of entries in a message log received at a certain time of day and determine the time of day with the most message traffic.

In still other examples of the method of FIG. 8, identifying (802) a message pattern (460) includes data mining with a clustering operator. By contrast to data mining with a classification operator whose input is a set of tagged entries in a message log, the input to a clustering operator is a set of untagged entries in a message log. No classes are known at the time the clustering operator is applied. Data mining with a cluster operator may be used to segment or classify the entries in a message log, such as by segmenting the entries by time of day or device ID. Many of the underlying mathematical operations used to build classification operators can also be used to build clustering operators.

While various data mining algorithms have been discussed separately, in various examples of the method of FIG. 8, different data mining algorithms can may be used together to identify message patterns. Furthermore, while the method of FIG. 8 has been described in detail with regard to data mining, any method identifying a subset of the message log that comprise a message pattern is within the scope of the present invention, not just data mining. In various exemplary embodiments, identifying a subset of the message log that comprise a message pattern includes using data discrimination, using artificial intelligence, using machine learning, using pattern recognition, or any method of identifying a subset of the message log that comprise a message pattern that will occur to those of skill in the art.

One example of off-the-shelf data mining software includes IBM's® "Intelligent Miner." "Intelligent Miner" can be operated in several computing environments including AIX, AS/400, and OS/390. The Intelligent Miner is an enterprise data mining tool, designed for client/server configurations and optimized to mine very large data sets, such as gigabyte data sets. The Intelligent Miner includes a plurality of data mining techniques or tools used to analyze large databases and provides visualization tools used to view and interpret the different mining results.

Having identified a message pattern, records representing such patterns may be created and usefully provide a vehicle for identifying workflows for execution when such messages in the networked environment conform to the identified message patterns. In the example of FIG. 8, a message pattern record (460) represents an identified message pattern. The entries in the message pattern record (460) include a message pattern ID (462) uniquely identifying the message pattern. Entries in the message pattern record (460) also include a message type (464) identifying a type of message sent to a device and the device ID (465) identifying the device to which the message is sent. Entries in the message pattern record also include the attributes (463) of the message defining the device controlling instruction contained in the message and a message sequence ID (466) identifying the position in the message pattern in which the particular message resides.

The method of FIG. 8 includes storing (806) the message pattern records (460) representing the identified message patterns in a message pattern database (616). A message pattern database maintains a plurality of message pattern records for use in identifying message patterns in the message traffic in the networked environment.

The method of FIG. 8 also includes identifying (804) a message pattern (460) in dependence upon a plurality of messages (718) sent to a device or a plurality of devices in the networked environment. A message pattern record represents a pre-identified pattern of messages. In the method of FIG. 8, identifying (804) a message pattern (460) in dependence upon a plurality of messages (718) may be carried out by comparing a plurality of messages in the networked environment or recent entries in a message log with a plurality of message pattern records in a message pattern database. In the example of FIG. 8, a window of the entries of the message log representing recent messages may be compared with message records to identify a matching message record. If such a matching message record exists, then it is inferred that the message traffic in the networked environment conforms to a message pattern represented by the message pattern record.

As will occur to those of skill in the art, in typical embodiments, the aspects of the messages in the message log or in traffic in the networked environment do not have to be exactly the same as the values of the message pattern records to identify a matching message pattern record. In fact, the values of the entries of the message log or messages in traffic will often not be the exactly the same as the values of the message pattern records when a matching record is identified. The degree to which the values of the entries in the message log or the messages in traffic must be similar to the values of the message pattern records to be considered a match will vary according to factors such as methods used to compare the messages and entries of the message log with the message pattern records, predefined tolerances for identifying a match, as well as other numerous factors that will occur to those of skill in the art.

The method of FIG. 8 includes identifying (805) a workflow scenario (708) in dependence upon the device usage pattern (328) and in dependence upon the message pattern (460). The workflow scenario of FIG. 8 may be either a scenario predetermined and predefined generally from many users in many networked environments, such as the scenario discussed above with reference to FIG. 3 given the reference number 344 or a derived scenario created in dependence upon the actual device usage within the networked environment discussed above with reference to FIG. 3 and given the reference number (352).

Identifying (805) a workflow scenario (708) in dependence upon the device usage pattern (328) and in dependence upon the message pattern (460) may be carried out by retrieving a workflow scenario ID (754) from a workflow scenario table (706). In the example of FIG. 7, a workflow scenario table (706) includes a plurality of workflow scenario IDs (754) indexed by device usage IDs (730) identifying predefined device usage patterns and message pattern IDs (462) identifying message patterns. Identifying (805) a workflow scenario (708) in dependence upon the device usage pattern (328) and in dependence upon the message pattern (460) therefore includes retrieving a workflow scenario ID (754) from a workflow scenario table (706) in dependence upon the device usage ID (331) of the identified device usage record (328) and the message pattern ID (462) of the identified message pattern.

In the method of FIG. 8, identifying (805) a workflow scenario (708) in dependence upon the device usage pattern (328) and in dependence upon the message pattern (460) may be is carried out in further dependence upon a rule (709). A rule (709) governs the identification of a particular workflow scenario among a plurality of workflow scenarios when more than one workflow scenario associated with a single device usage pattern exists and message pattern exists.

Having identified a workflow scenario, workflow decision management according to embodiments of the present invention may proceed by identifying a workflow and executing the workflow as discussed above with reference to FIG. 7. The addition of message patterns usefully provides additional granularity in selecting workflow scenarios and provides a vehicle for better tailoring the results of workflow decision management in a networked environment.

Workflow Decision Management With Intermediate Message Validation

As discussed above, a workflow is software implementing a device controlling action that when executed changes the values of one or more attributes of one or more devices in accordance with the present invention. Such software effects the device controlling action by sending a message to a device instructing the device to change the value of an attribute. Devices in workflow decision management systems may be at risk of receiving messages implementing destructive actions implemented by viruses or other destructive entities. Destructive messages may be sent to one or more devices in a networked environment instructing the device to administer its attributes causing damage to the device. Such destructive messages may be created to have enough similarity to the defined packets structures of protocols used in workflow decision management that a receiving device will respond to the message in a manner destructive to the device. Such destructive messages may also be sent by invalid workflows created as viruses and installed on one or more devices under workflow decision management. To reduce the possibility of destructive messages causing damage to device intermediate message validation services are provided for message validation.

Figure 9:
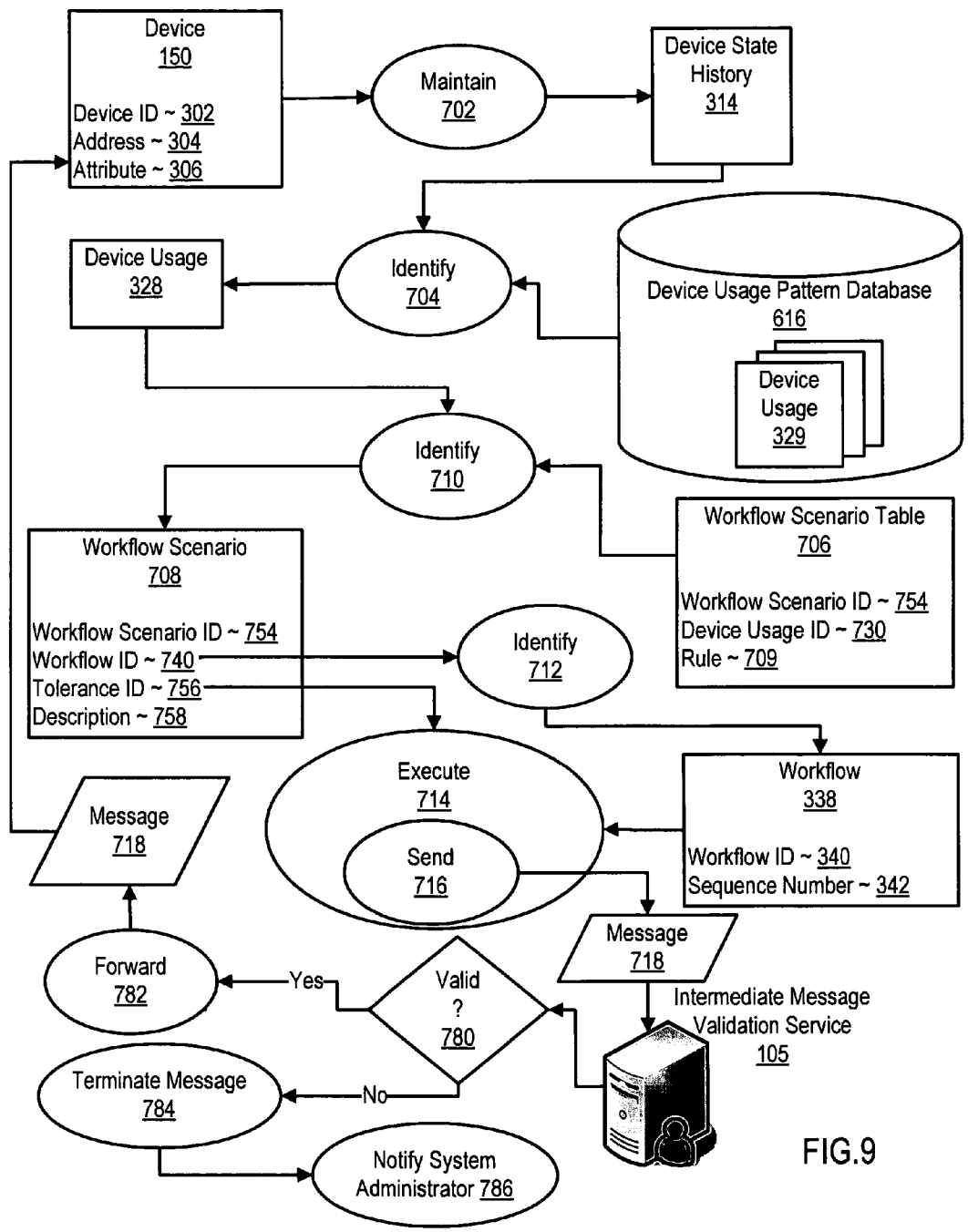
FIG. 9 sets forth a data flow diagram illustrating an exemplary method for workflow decision management that includes determining whether a message sent to a device is valid.

For further explanation, FIG. 9 sets forth a data flow diagram illustrating an exemplary method for workflow decision management that includes determining whether a message sent to a device is valid. As with the examples of FIGS. 6 and 7 discussed above, the method of FIG. 9 includes maintaining (702) a device state history (314); identifying (704) a device usage pattern (328) in dependence upon the device state history (314); identifying a workflow scenario (708) in dependence upon the device usage pattern (328); and identifying (712) a workflow (338) in dependence upon the workflow scenario (708).

The method of FIG. 9 also includes executing (714) the identified workflow (338). As discussed above, a workflow is software implementing a device controlling action that when executed changes the values of one or more attributes of one or more devices in accordance with the present invention. Such software effects the device controlling action by sending a message to a device instructing the device to change the value of an attribute. In the example of FIG. 9, however, instead of sending the message directly to the device, executing (714) the identified workflow (338) is carried out by sending (716), to an intermediate message validation service (105), a message (718) to be forwarded to a device (150) to administer at least one value of an attribute (306) of the device (150). Such a message may be sent to an intermediate message validation service with routing information dictating one or more devices intended as recipients of the message and to which the intermediate message validation service is to forward the message upon determining that the message is valid.

The method FIG. 9 includes determining (780), by the intermediate message validation service (105), whether the message is valid. Determining (780) whether the message is valid may be carried out by determining differences between the structure of a packet of the message and a predefined proper packet structure and determining whether differences between the structure of the packet of the message and the predefined proper packet structure do not exceed a threshold similarity requirement as discussed in more detail below with reference to FIG. 10.

If the message is valid, the method of FIG. 9 includes forwarding (782), by the intermediate message validation service (105), the valid message (718) to the device (150). Forwarding (782), by the intermediate message validation service (105), the valid message (718) to the device (150) may be carried out by sending one or more packets of the message from the intermediate validation service (105) to the device (150) according to routing information provided in the original message as sent to execute the workflow identified in response to the device usage pattern on the network.

Workflow decision management according to embodiments of the present invention may also include logging the valid message. Logging the valid message may be carried out by recording in a message log message information describing the valid message. As discussed above with reference to FIG. 7, a message log is a data structure containing entries representing individual messages sent to one or more devices in the networked environment. Message logs usefully provide a record of the messages sent to device effecting the execution of workflows according to the present invention.

If the message is invalid, the method of FIG. 9 includes terminating (784), by the intermediate message validation service (105), the invalid message (718). Terminating (784), by the intermediate message validation service (105), the invalid message (718) may be carried out by storing the invalid message (718) in a dead message queue (996 on FIG. 5). Such a dead message queue may be implemented as data storage designed to receive the invalid messages and designed to quarantine the invalid messages from traffic on the network. Such a dead message queue may therefore also provide a log of invalid messages on the network useful in examining invalid message traffic and identifying the sender of such invalid messages.

Terminating (784), by the intermediate message validation service (105), the message (718) to the device (150) may alternatively include dropping one or more invalid packets of the invalid message (718). Dropping invalid packets of the invalid message terminates the forwarding of the message advantageously protecting the device from potentially harmful instructions carried in invalid messages.

The method of FIG. 9 also includes notifying (786) a system administrator that the message (718) is invalid. Notifying (786) a system administrator that the message (718) is invalid may be carried out by sending an email to a system administrator, providing a dead message queue to a system administrator, or any other way of notifying a system administrator of invalid messages that will occur to those of skill in the art. Notifying a system administrator usefully informs system administrators of invalid, and therefore potentially destructive, message traffic on the network.

Figure 10:
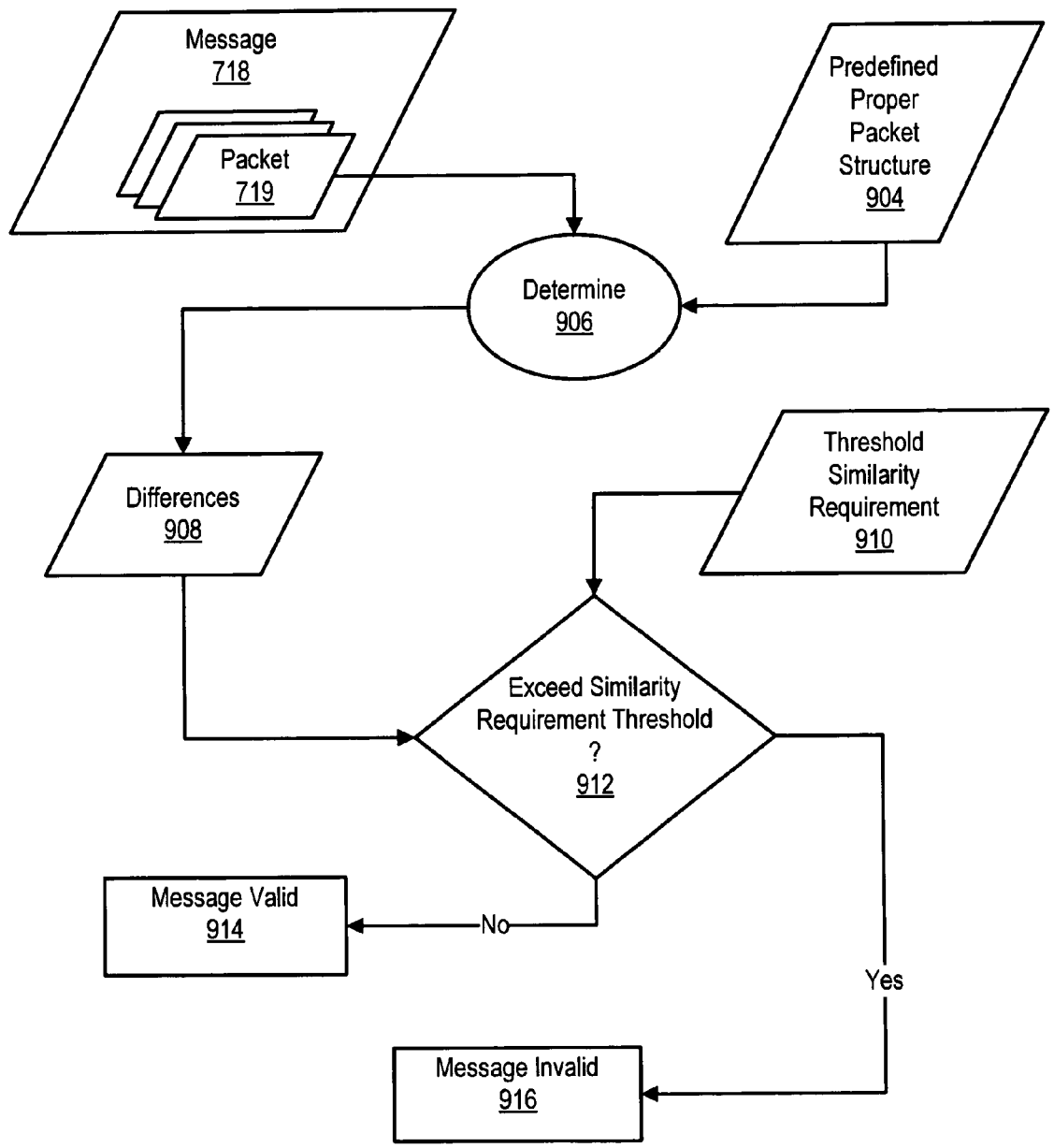
FIG. 10 sets forth a data flow diagram illustrating an exemplary method for determining whether a message sent to a device is valid.

In the example of FIG. 9, a message is only forwarded to a device if the message is determined to be valid. For further explanation, therefore, FIG. 10 sets forth a data flow diagram illustrating an exemplary method for determining whether a message sent to a device is valid. In the method of FIG. 10, determining whether a message is valid is carried out by determining (906) differences (908) between the structure of a packet (719) of the message (718) and a predefined proper packet structure (904). Determining (906) differences (908) between the structure of a packet (719) of the message (718) and a predefined proper packet structure (904) is often carried out by comparing one or more packets of the message with a predefined proper message structure. Such comparison may be carried out using various granularity of comparison such as bit-by-bit, byte-by-byte, and so on.

A predefined proper packet structure useful in valid message identification may be derived from specifications defining protocols used in the networked environment for workflow decision management. A predefined proper packet structure may be implemented device-by-device in a networked environment, or may be implemented network wide. That is, a predefined proper packet structure for one device may vary from a predefined proper packet structure of another device in the networked environment. Alternatively, a single predefined proper packet structure may be implemented for the networked environment as a whole.

The differences (908) between the structure of a packet (719) of the message (718) and a predefined proper packet structure (904) may be a numerical representation of the number of differences between the structure of the packet of the message and a predefined proper packet structure. That is, the differences (908) between the structure of a packet (719) of the message (718) and a predefined proper packet structure (904) may be determined by comparing the packet of the message and the predefined proper packet structure and counting the differences bit-by-bit, byte-by-byte, and so on.

Alternatively, determining the differences (908) between the structure of a packet (719) of the message (718) and a predefined proper packet structure (904) may be carried out by identifying qualitative differences between the packet and the proper packets structure. Examples of a qualitative difference between a packet of the message and the predefined proper packet structure includes required values in required locations in the proper packets structure not found in the packet of the message sent to the device.

As mentioned above, a predefined proper packet structure useful in valid message identification may be derived from specifications defining protocols used in the networked environment for workflow decision management. For further explanation, therefore, FIG. 11 sets forth a data flow diagram of an example of determining (906) differences (908) between the structure of a packet (719) of the message (718) and a predefined proper packet structure derived from the CEBus specification. "CEBus" is an abbreviation for Consumer Electronics Bus. CEBus is an open international standard for controlling devices over different media such as power line, radio frequency (RF), infrared (IR), coaxial cable, twisted pair, fiber optics and audio/video. The CEBus standard is promulgated by the Consumer Electronic Manufacturers Association (CEMA), a sector of the Electronics Industries Association (EIA) and described in 12 standards: the ANSI/EIA-600 series. The CEBus standard describes a physical design and topology of network media, a protocol for message generation, and a common application language ("CAL"). The CEBus specification is available for download at http://www.cebus.org.

Figure 11:
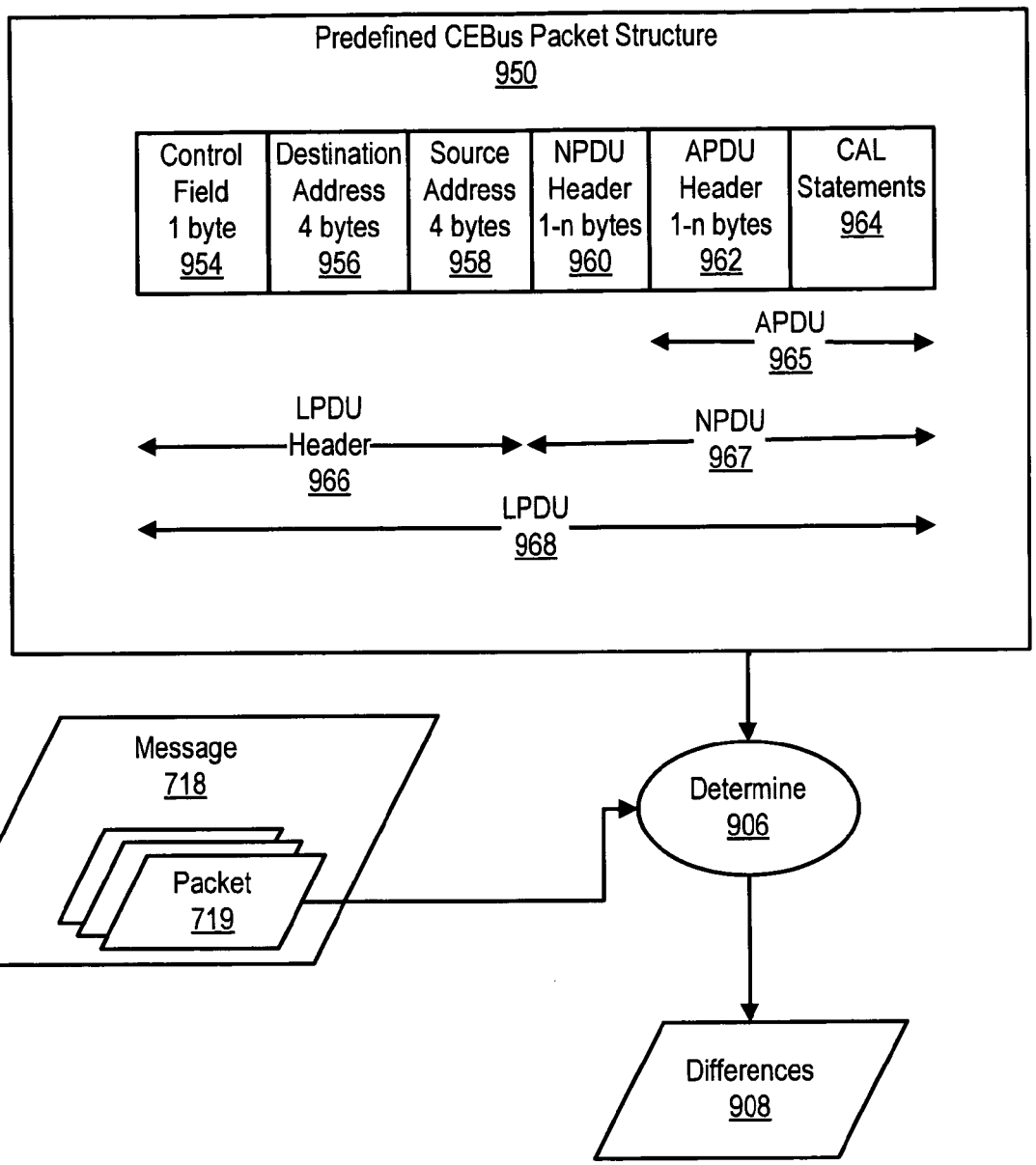
FIG. 11 sets forth a data flow diagram of an example of determining differences between the structure of a packet of the message and a predefined proper packet structure derived from the CEBus specification.

The exemplary predefined CEBus packet structure (950) of FIG. 11 includes a Link Protocol Data Unit ('LPDU') (968). The LDPU (968) is a maximum length of 41 bytes and includes a LPDU header (966) that contains the control field (954) that is one byte long. The control field identifies the packet type, packet priority, and service class to the data link layer. The LPDU header (966) also contains the destination address (956) and the source address (958). In the example of FIG. 11, the destination address (956) is four bytes long and the source address (958) is four bytes long. The LPDU (968) also includes CAL Statements (964) including command or status information often used to administer one or more attributes of a device.

The exemplary predefined CEBus packet structure (950) of FIG. 11 includes a Network Protocol Data Unit ('NPDU') (967) that includes a NPDU header (960) and CAL statements (964). The NPDU header (960) specifies how a packet is sent.

The exemplary predefined CEBus packet structure (950) of FIG. 11 also includes an Application Protocol Data Unit ('APDU') (965) that includes an APDU header (962), and CAL statements (964). The APDU header (962) specifies how and if a receiving application layer should respond to the packet.

Determining (906) differences (908) between the structure of a packet (719) of the message (718) and the predefined CEBus Packet structure (950) according to the example of FIG. 11 may be carried out by comparing a packets of the message with each aspect of the predefined CEBUS packets structure and determining any difference between the length and content an LPDU, NPDU, and APDU of the packet (719) and the required length and content of the LPDU, NPDU, and APDU of the predefined CEBUS packet structure (950).

The inclusion of a predefined CEBUS packet structure (950) is for explanation and not for limitation. In fact, workflow decision management may be implemented using many protocols and predefined proper packet structures may be derived for any such protocols and all such predefined proper packet structures are well within the scope of the present invention.

Again with reference to FIG. 10: After determining (906) differences (908) between the structure of a packet (719) of the message (718) and a predefined proper packet structure (904), the method of FIG. 10 also includes determining (912) that differences (908) between the structure of the packet (719) of the message (718) and the predefined proper packet structure (904) do not exceed a threshold similarity requirement (910). A threshold similarity requirement (910) is implemented as one or more rules defining the required similarity between the structure of the packet of the message (718) and the predefined proper packets structure for a determination that the message is valid. For further explanation consider the following threshold similarity requirement:

IF number of bits in packet of message>number of bits in predefined proper packet structure; OR
IF number of bits in packet of message<number of bits in predefined proper packet structure;
THEN message=invalid.
ELSE message=valid.

In the example above, one or more packets of the message are compared bit-by-bit with the predefined proper packet structure to determine if the number of bits in a packet of message is greater or less than the number of bits in predefined proper packet structure. In this example, the message is determined to be invalid if the number of bits in packet of message is greater or less than the number of bits in predefined proper packet structure. The message is determined to be valid if the number of bits in the packet of the message is exactly the same number of bits in the predefined proper packet structure.

In the method of FIG. 10, the message is determined to be valid (914) if the differences (908) between the structure of the packet (719) of the message (718) and the predefined proper packet structure (904) do not exceed a threshold similarity requirement (910). As discussed above, valid messages are typically forwarded to the intended device to implement one or more workflows.

In the method of FIG. 10, the message is determined to be invalid (916) if the differences (908) between the structure of the packet (719) of the message (718) and the predefined proper packet structure (904) exceed a threshold similarity requirement (910). As discussed above, invalid messages are typically terminated thereby removing potentially dangerous messages from the network traffic.

Exemplary embodiments of the present invention are described largely in the context of a fully functional computer system for workflow decision management. Readers of skill in the art will recognize, however, that the present invention also may be embodied in a computer program product disposed on recordable media for machine-readable information, including magnetic media, optical media, or other suitable media. Examples of recordable media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for workflow decision management, the method comprising:
maintaining a device state history;
identifying a device usage pattern in dependence upon the device state history;
identifying a workflow scenario in dependence upon the device usage pattern;
identifying a workflow in dependence upon the workflow scenario;
executing the workflow including:
sending, to an intermediate message validation service, a message to be forwarded to a device to administer at least one value of an attribute of the device;
determining, by the intermediate message validation service, that the message is valid, further comprising:
determining differences between the structure of a packet of the message and a predefined proper packet structure, wherein the predefined proper packet structure is derived from the Consumer Electronics Bus ('CEBus') specification, and the predefined proper packet structure includes a Link Protocol Data Unit ('LPDU'), a Network Protocol Data Unit ('NPDU'), and an Application Protocol Data Unit ('APDU');
determining that differences between the structure of the packet of the message and the predefined proper packet structure do not exceed a threshold similarity requirement, further comprising:
determining a difference between a length and content of an LPDU, NPDU, and APDU of the packet and a length and content of the LPDU, NPDU, and APDU of the predefined proper packet structure; and
forwarding, by the intermediate message validation service, the valid message to the device.

2. The method of claim 1 wherein determining, by the intermediate message validation service, that the message is valid further comprises:
determining differences between the structure of a packet of the message and a predefined proper packet structure;
determining that differences between the structure of the packet of the message and the predefined proper packet structure do not exceed a threshold similarity requirement.

3. The method of claim 2 wherein determining differences between the structure of a packet of the message and a predefined proper packet structure further comprises counting the differences between the structure of a packet of the message and a predefined proper packet structure.

4. The method of claim 2 wherein determining differences between the structure of a packet of the message and a predefined proper packet structure further comprises identifying a qualitative difference between the structure of a packet of the message and a predefined proper packet structure.

5. The method of claim 2 wherein the predefined proper packet structure further comprises a predefined proper packets structure for the device.

6. The method of claim 2 wherein the predefined proper packet structure further comprises a predefined proper packets structure for a network of the device.

7. A system for workflow decision management, the system comprising:
  a computer processor,
  a computer memory operatively coupled to the computer processor, the computer memory having disposed within it computer program instructions capable of:
  maintaining a device state history;
  identifying a device usage pattern in dependence upon the device state history;
  identifying a workflow scenario in dependence upon the device usage pattern;
  identifying a workflow in dependence upon the workflow scenario;
  executing the workflow including:
  sending, to an intermediate message validation service, a message to be forwarded to a device to administer at least one value of an attribute of the device;
  determining, by the intermediate message validation service, that the message is valid, further comprising:
    determining differences between the structure of a packet of the message and a predefined proper packet structure, wherein the predefined proper packet structure is derived from the Consumer Electronics Bus ('CEBus') specification, and the predefined proper packet structure includes a Link Protocol Data Unit ('LPDU'), a Network Protocol Data Unit ('NPDU'), and an Application Protocol Data Unit ('APDU');
    determining that differences between the structure of the packet of the message and the predefined proper packet structure do not exceed a threshold similarity requirement, further comprising:
      determining a difference between a length and content an LPDU, NPDU, and APDU of the packet and a length and content of the LPDU, NPDU, and APDU of the predefined proper packet structure; and
  forwarding, by the intermediate message validation service, the valid message to the device.

8. The system of claim 7 wherein the computer memory also has disposed within it computer program instructions capable of:
  determining differences between the structure of a packet of the message and a predefined proper packet structure;
  determining that differences between the structure of the packet of the message and the predefined proper packet structure do not exceed a threshold similarity requirement.

9. The system of claim 8 wherein the computer memory also has disposed within it computer program instructions capable of counting the differences between the structure of a packet of the message and a predefined proper packet structure.

10. The system of claim 8 wherein the computer memory also has disposed within it computer program instructions capable of identifying a qualitative difference between the structure of a packet of the message and a predefined proper packet structure.

11. The system of claim 8 wherein the predefined proper packet structure further comprises a predefined proper packets structure for the device.

12. The system of claim 8 wherein the predefined proper packet structure further comprises a predefined proper packets structure for a network of the device.

13. A computer program product for workflow decision management, the computer program product disposed upon a recordable medium for machine-readable information, the computer program product comprising:
  computer program instructions for maintaining a device state history;
  computer program instructions for identifying a device usage pattern in dependence upon the device state history;
  computer program instructions for identifying a workflow scenario in dependence upon the device usage pattern;
  computer program instructions for identifying a workflow in dependence upon the workflow scenario;
  computer program instructions for executing the workflow including:
  computer program instructions for sending, to an intermediate message validation service, a message to be forwarded to a device to administer at least one value of an attribute of the device;
  computer program instructions for determining that the message is valid, further comprising:
    computer program instructions for determining differences between the structure of a packet of the message and a predefined proper racket structure, wherein the predefined proper packet structure is derived from the Consumer Electronics Bus ('CEBus') specification, and the predefined proper packet structure includes a Link Protocol Data Unit ('LPDU'), a Network Protocol Data Unit ('NPDU'), and an Application Protocol Data Unit ('APDU');
    computer program instructions for determining that differences between the structure of the packet of the message and the predefined proper packet structure do not exceed a threshold similarity requirement, further comprising:
      computer program instructions for determining a difference between a length and content an LPDU, NPDU, and APDU of the packet and a length and content of the LPDU, NPDU, and APDU of the predefined proper packet structure; and
  computer program instructions for forwarding the valid message to the device.

14. The computer program product of claim 13 wherein computer program instructions for determining that the message is valid further comprise:
  computer program instructions for determining differences between the structure of a packet of the message and a predefined proper packet structure;
  computer program instructions for determining that differences between the structure of the packet of the message and the predefined proper packet structure do not exceed a threshold similarity requirement.

15. The computer program product of claim 14 wherein computer program instructions for determining differences between the structure of a packet of the message and a predefined proper packet structure further comprise computer program instructions for counting the differences between the structure of a packet of the message and a predefined proper packet structure.

16. The computer program product of claim 14 wherein computer program instructions for determining differences between the structure of a packet of the message and a predefined proper packet structure further comprise computer program instructions for identifying a qualitative difference between the structure of a packet of the message and a predefined proper packet structure.

17. The computer program product of claim 14 wherein the predefined proper packet structure further comprises a predefined proper packets structure for the device.

18. The computer program product of claim 14 wherein the predefined proper packet structure further comprises a predefined proper packets structure for a network of the device.

* * * * *

UNITED STATES PATENT AND TRADEMARK OFFICE
CERTIFICATE OF CORRECTION

PATENT NO. : 7,657,636 B2 Page 1 of 1
APPLICATION NO. : 11/264806
DATED : February 2, 2010
INVENTOR(S) : Brown et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1097 days.

Signed and Sealed this

Thirtieth Day of November, 2010

David J. Kappos
*Director of the United States Patent and Trademark Office*